(12) United States Patent
Kim et al.

(10) Patent No.: US 8,408,738 B2
(45) Date of Patent: Apr. 2, 2013

(54) LIGHT EMITTING DEVICE

(75) Inventors: Sungwoo Kim, Pyungtaek-si (KR);
Soonhyung Kwon, Pyungtaek-si (KR);
Bupsung Jung, Pyungtaek-si (KR);
Seungchoon Bae, Pyungtaek-si (KR);
Buwan Seo, Pyungtaek-si (KR);
Sangtae Park, Pyungtaek-si (KR)

(73) Assignee: LG Electronics Inc., Seoul (KR)

( * ) Notice: Subject to any disclaimer, the term of this patent is extended or adjusted under 35 U.S.C. 154(b) by 73 days.

(21) Appl. No.: 12/764,717

(22) Filed: Apr. 21, 2010

(65) Prior Publication Data

US 2010/0265694 A1 Oct. 21, 2010

(30) Foreign Application Priority Data

Apr. 21, 2009 (KR) .................. 10-2009-0034693
Aug. 27, 2009 (KR) .................. 10-2009-0079710
Nov. 24, 2009 (KR) .................. 10-2009-0114225

(51) Int. Cl.
*F21S 4/00* (2006.01)
*F21V 7/22* (2006.01)

(52) U.S. Cl. ............. 362/249.02; 362/311.02; 362/241; 257/100

(58) Field of Classification Search ............ 362/249.02, 362/97.3, 311.02, 296.02, 296.04, 800, 241; 362/245, 310; 257/100, 98
See application file for complete search history.

(56) References Cited

U.S. PATENT DOCUMENTS

| 5,397,867 | A * | 3/1995 | Demeo ................... 200/5 A |
| 7,196,464 | B2 * | 3/2007 | Chen et al. ............... 313/497 |
| 7,222,993 | B2 * | 5/2007 | Kikuchi et al. ............. 362/300 |
| 7,654,687 | B2 * | 2/2010 | Tsai et al. ................ 362/237 |
| 7,728,333 | B2 * | 6/2010 | Kastalsky ................. 257/72 |
| 7,787,073 | B2 * | 8/2010 | Bang ..................... 349/62 |
| 7,815,355 | B2 * | 10/2010 | Thompson et al. ........... 362/560 |
| 7,829,899 | B2 * | 11/2010 | Hutchins .................. 257/79 |
| 7,866,853 | B2 * | 1/2011 | Ohashi et al. ............ 362/296.01 |
| 7,906,352 | B2 * | 3/2011 | Brunner et al. ............. 438/22 |
| 7,943,951 | B2 * | 5/2011 | Kim et al. ................ 257/100 |
| 7,989,840 | B2 * | 8/2011 | Sanpei et al. .............. 257/100 |
| 8,021,033 | B2 * | 9/2011 | Tokita et al. ............... 362/615 |
| 8,054,279 | B2 * | 11/2011 | Umezaki et al. ............ 345/100 |
| 2004/0252488 | A1 * | 12/2004 | Thurk .................... 362/147 |
| 2005/0265029 | A1 | 12/2005 | Epstein et al. |
| 2006/0023451 | A1 * | 2/2006 | Han et al. ................ 362/249 |
| 2006/0164840 | A1 | 7/2006 | Song et al. |
| 2007/0019394 | A1 | 1/2007 | Park et al. |
| 2009/0034230 | A1 | 2/2009 | Lim et al. |
| 2009/0086508 | A1 | 4/2009 | Bierhuizen |
| 2009/0091920 | A1 * | 4/2009 | Naijo et al. ............... 362/97.3 |
| 2009/0129058 | A1 | 5/2009 | Tokita et al. |

FOREIGN PATENT DOCUMENTS

| JP | 2006-209120 A | 8/2006 |
| JP | 2007-180021 A | 7/2007 |
| KR | 10-2007-0012085 A | 1/2007 |
| KR | 10-2007-0060922 A | 6/2007 |
| KR | 10-0867402 B1 | 10/2008 |
| WO | 2006/131924 A2 | 12/2006 |
| WO | 2007/138294 A1 | 12/2007 |

* cited by examiner

*Primary Examiner* — Peggy A. Neils
(74) *Attorney, Agent, or Firm* — Birch, Stewart, Kolasch & Birch, LLP

(57) ABSTRACT

A light emitting device is disclosed. The light emitting device includes a reflective layer, a plurality of light emitting components disposed on the reflective layer, and a resin layer formed on the plurality of light emitting components and the reflective layer.

8 Claims, 26 Drawing Sheets

LIGHT EMITTING DEVICE

This application claims the benefit of Korean Patent Application Nos. 10-2009-0034693 filed on Apr. 21, 2009, 10-2009-0079710 filed on Aug. 27, 2009 and 10-2009-0114225 filed on Nov. 24, 2009 which are incorporated herein by reference for all purposes as if fully set forth herein.

BACKGROUND OF THE INVENTION

1. Field of the Invention

The present invention relates to a light emitting device.

2. Discussion of the Related Art

With development of an information society, a requirement for a display apparatus is also being increased in various forms. Various display apparatuses such as a liquid crystal display apparatus (LCD), a plasma display panel (PDP), an electro luminescent display (ELD), a vacuum fluorescent display (VFD), etc. have been recently researched and used by complying with the requirement.

Among various display apparatuses, a liquid crystal panel of the LCD includes a liquid crystal layer, and a TFT substrate and a color filter substrate that are opposed to each other with the liquid crystal layer interposed therebetween. Since the liquid crystal panel has no self-luminous intensity, the liquid crystal panel can display an image by using light provided from a backlight unit.

SUMMARY OF THE INVENTION

In one aspect, there is a light emitting device comprising a reflective layer, a plurality of light emitting components disposed on the reflective layer, and a resin layer formed on the plurality of light emitting components and the reflective layer.

The light emitting device may further comprise a protective layer disposed on the resin layer.

The plurality of light emitting components may be a plurality of light emitting chips. The plurality of light emitting components may be a plurality of light emitting packages, each package including a light emitting chip. The plurality of light emitting components may be disposed in at least one array.

The resin layer may completely cover the light emitting components disposed on the reflective layer.

The resin layer may contact the light emitting components and the reflective layer.

The light emitting device may further comprise a substrate disposed under the plurality of light emitting components.

The reflective layer may include a metal layer. The reflective layer may include a reflective sheet and a plurality of diffusers disposed on the reflective sheet. The reflective layer may have a thickness in a range of 50 μm to 300 μm. The reflective layer may have a reflectivity equal to or greater than 85%.

A thickness of at least one of the plurality of light emitting components may be equal to a thickness of the resin layer. A thickness of at least one of the plurality of light emitting components may be greater than a thickness of the resin layer.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
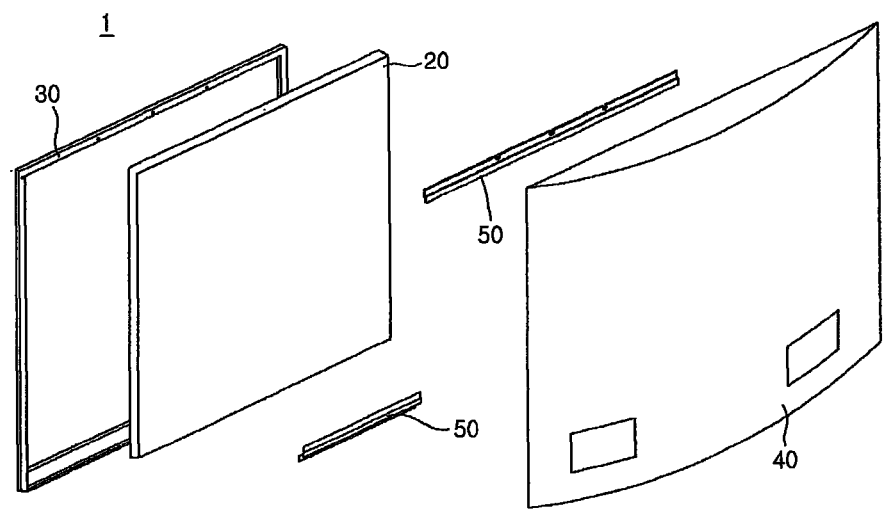
FIG. 1 is an exploded perspective view illustrating a configuration of a display apparatus.

FIG. 1 is an exploded perspective view illustrating a configuration of a display apparatus.

Referring to FIG. 1, the display apparatus 1 can include a display module 20, a front cover 30 and a back cover 40 covering the display module 20, a fixation member 50 for fixing the display module 20 to the front cover 30 and/or the back cover 40.

Meanwhile, the front cover 30 can include a front panel (not shown) made of a transparent material, which transmits light. The front panel is disposed in the display module 20, more particularly, in the front of a display panel (not shown) included in the display module to protect the display module 20 from an external shock and show a picture displayed in the display module 20 by transmitting light emitted from the display module 20 to the outside.

One side of the fixation member 50 is fixed to the front cover 30 by a fastening member such as a screw, for example and the other side supports the display module 20 to the front cover 30 to fix the display module 20 to the front cover 30.

In the embodiment, the fixation member 50 has a plate shape that extends lengthily in one direction, for example, but the additional fixation member 50 is not provided and the display module 20 can be configured to be fixed to the front cover 30 or the back cover 40 by the fastening member.

Figure 2:
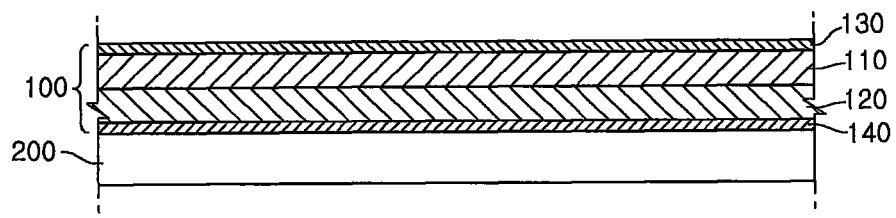
FIG. 2 is a cross-sectional view illustrating a schematic configuration of a display module.

FIG. 2 is a cross-sectional view illustrating a schematic configuration of a display apparatus according to an embodiment of the present invention. The display module 20 provided in the display apparatus can be configured to include a display panel 100 and a backlight unit 200.

Referring to FIG. 2, the display panel 100 includes a color filter substrate 110 and a thin film transistor (TFT) substrate 120 that are opposed to each other and attached to have a uniform cell gap. A liquid crystal layer (not shown) can be interposed between the two substrates 110 and 120.

The color filter substrate 110 includes a plurality of pixels that consist of red (R), green (G), and blue (B) sub-pixels and can generate an image corresponding to a red, green, or blue color when the light is applied.

Meanwhile, the pixels can be composed of the red, green, and blue sub-pixels, but is not limited thereto like one example in which red, green, blue, and white (W) sub-pixels configure one pixel and the pixel can be configured by various combinations.

The TFT substrate 120 can switch a pixel electrode (not shown) as a switching device. For example, a common electrode (not shown) and the pixel electrode can transform the array of molecules of the liquid crystal layer depending on a predetermined voltage applied from the outside.

The liquid crystal layer is composed of a plurality of liquid crystal molecules. The liquid crystal molecules change the array in accordance with a voltage difference generated between the pixel electrode and the common electrode. As a result, light provided from the backlight unit 200 can be inputted into the color filter substrate 110 in accordance with the change of the array of the molecules of the liquid crystal layer.

Further, an upper polarizer 130 and a lower polarizer 140 can be disposed on the top and the bottom of the display panel 100, respectively, and more particularly, the upper polarizer 130 can be formed on the top of the color filter substrate 110 and the lower polarizer 140 can be formed on the bottom of the TFT substrate 120.

Meanwhile, a gate and a data driver (not shown) that generate a driving signal for driving the panel 100 can be provided on the side of the display panel 100.

The structure and configuration of the display panel 100 are just one example and modification, addition, and deletion the embodiment can be made within the scope without departing from the spirit of the present invention.

As shown in FIG. 2, the display apparatus according to the embodiment of the present invention can be configured by closely disposing the backlight unit 200 to the display panel 100.

For example, the backlight unit 200 can be bonded and fixed onto the bottom of the display panel 100, more particularly, the lower polarizer 140. For this, an adhesive layer (not shown) can be interposed between the lower polarizer 140 and the backlight unit 200.

As described above, it is possible to reduce the entire thickness of the display apparatus by closely contacting the backlight unit 200 to the display panel 100, thereby improving the exterior of the display apparatus and it is possible to simplify the structure and manufacturing process of the display apparatus by removing a structure for fixing the backlight unit 200.

Further, by removing a gap between the backlight unit 200 and the display panel 100, it is possible to prevent malfunction of the display apparatus or deterioration in an image quality of a display picture that is caused due to insertion of foreign substances, etc. into the gap.

According to the embodiment of the present invention, the backlight unit 200 can be configured by laminating a plurality of function layers and at least one layer of the plurality of function layers can be provided with a plurality of light sources (not shown).

Further, as described above, it is preferable that the backlight unit 200, more particularly, a plurality of layers configuring the backlight unit 200 are made of flexible materials, respectively, so as to closely fix the backlight unit 200 onto the bottom of the display panel 100.

In addition, a bottom cover (not shown) on which the backlight unit 200 is seated can be provided on the bottom of the backlight unit 200.

According to the embodiment of the present invention, the display panel 100 can be divided into a plurality of regions. The brightness of light emitted from a corresponding region of the backlight unit 200, that is, the brightness of the corresponding light source is adjusted in accordance with a gray peak value or a color coordinate signal of each of the divided regions, such that the luminance of the display panel 100 can be adjusted.

For this, the backlight unit 200 can operate by being divided into a plurality of division driving regions corresponding to the divided regions of the display panel 100, respectively.

Figure 3:
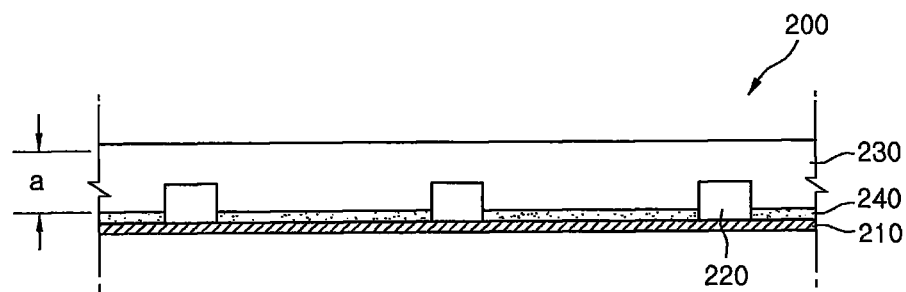
FIG. 3 is a cross-sectional view illustrating a configuration of a backlight unit according to a first embodiment of the present invention.

FIG. 3 is a cross-sectional view illustrating a configuration of a backlight unit according to a first embodiment of the present invention. The illustrated backlight unit 200 can include a first layer 210, light sources 220, a second layer 230, and a reflection layer 240.

Referring to FIG. 3, the plurality of light sources 220 are formed on the first layer 210 and the second layer 230 is disposed on the top of the first layer 210 to cover the plurality of light sources 220.

The first layer 210 may be a substrate on which the plurality of light sources 220 are mounted. An electrode pattern (not shown) for connecting the light source 220 with an adapter for supplying power may be formed on the first layer 210. For example, a carbon nanotube electrode pattern (not shown) for connecting the adapter (not shown) with the light source 220 can be formed on the top of the substrate.

Meanwhile, the first layer 210 is formed by using polyethyleneterephthalate, glass, polycarbonate, silicon, etc. and may be a printed circuit board (PCB) substrate on which the plurality of light sources 220 are mounted and may have a film shape.

The light source 220 may be a light emitting diode (LED) chip or one of a light emitting diode packages with at least one light emitting diode chip. In the embodiment, one example in which the light emitting diode package is provided as the light source 220 will be described.

Meanwhile, the LED packages configuring the light source 220 can be classified into a top view scheme and a side view scheme in accordance with a direction in which a light emitting surface faces. The light source 220 according to the embodiment of the present invention can be configured by using at least one of the top view-type LED package in which the light emitting surface is formed to face the top side and the side view-type LED package in which the light emitting surface is formed to face the side surface.

Further, the light source 220 can be configured by a colored LED or a white LED emitting at least one color among colors such as red, blue, and green colors, etc. In addition, the colored LED can include at least one of a red LED, a blue LED, and a green LED. The disposition and emitting light of the light emitting diode can be changed within a technical scope of the embodiment.

Meanwhile, the second layer 230 formed to be disposed on the top of the first layer 210 to cover the plurality of light sources 220 can uniformly provide the light emitted from the light source 220 to the display panel 100 by transmitting and diffusing the light emitted from the light source 220.

The reflection layer 240 that reflects the light emitted from the light source 220 can be formed between the first layer 210 and the second layer 230, more particularly, on the top of the first layer 210. The reflection layer 240 can more widely diffuse the light emitted from the light source 220 by reflecting light full-reflected from a boundary of the second layer 230 again.

The reflection layer 240 can use a sheet to which a white pigment such as titanium oxide is dispersed to a sheet made of a synthetic resin, a sheet laminated with a metal deposition film onto the surface thereof, a sheet in which a bubble is dispersed so as to diffuse the light to a sheet made of the synthetic resin, etc. The surface of the reflection layer 240 may be coated with silver (Ag) so as to increase the reflectance. Meanwhile, the reflection layer 240 may be coated on the top of the first layer 210 which is the substrate.

The second layer 230 can be configured by a light transmissive material, i.e., silicon or an acrylic resin. However, the second layer 230 is not limited to the above-mentioned material and can be configured by various resins in addition to the above-mentioned material.

Further, the second layer 230 can be made of a resin having a refractive index of approximately 1.4 to 1.6 so that the backlight unit 200 has uniform luminance by diffusing the light emitted from the light source 220.

For example, the second layer 230 can be made of any one material selected from a group consisting of polyethyleneterephthalate, polycarbonate, polypropylene, polyethylene, polystyrene and polyepoxy, silicon, acryl, etc.

The second layer 230 can include a polymer resin having predetermined adhesion so as to be tightly and closely adhere to the light source 220 and the reflection layer 240. For example, the second layer 230 can be configured to include an acrylic resin such as unsaturated polyester, methylmethacrylate, ethylmethacrylate, isobutylmethacrylate, normal butylmethacrylate, normal butylmethylmethacrylate, acrylic acid, methacrylic acid, hydroxy ethylmethacrylate, droxy propylmethacrylate, hydroxy ethylacrylate, acrylamide, methylol acrylamide, glycidyl methacrylate, ethylacrylate, isobutylacrlate, normal butylacrylate, 2-ethylhexyl acrylate polymer, or copolymer, or terpolymer, etc., an urethane resin, an epoxy resin, a melamine resin, etc.

The second layer 230 may be formed by applying and curing a liquid or gel-type resin onto the top of the first layer 210 where the plurality of light sources 220 and the reflection layer 240 are formed or the second layer 230 may be formed by adhering onto the top of the first layer 210 by being separately fabricated.

Meanwhile, as the thickness a of the second layer 230 increases, the light emitted from the light source 200 is more widely diffused, such that the light having uniform luminance can be provided to the display panel 100 from the backlight unit 200. In contrast, as the thickness a of the second layer 230 increases, the quantity of light which is absorbed in the second layer 230 can increase. Therefore, the luminance of the light provided to the display panel 100 from the backlight unit 200 can uniformly decrease.

Accordingly, in order to provide the light having uniform luminance while not largely decreasing the luminance of the light provided to the display panel 100 from the backlight unit 200, it is preferable that the thickness a of the second layer 230 is in the range of 0.1 to 4.5 mm.

Hereinafter, the configuration of the backlight unit 200 according to the embodiment of the present invention will be described in detail by using a case in which the first layer 210 provided in the backlight unit 100 is a substrate where the plurality of light sources 200 are formed and the second layer 230 is a resin layer made of a predetermined resin as one example.

Figure 4:
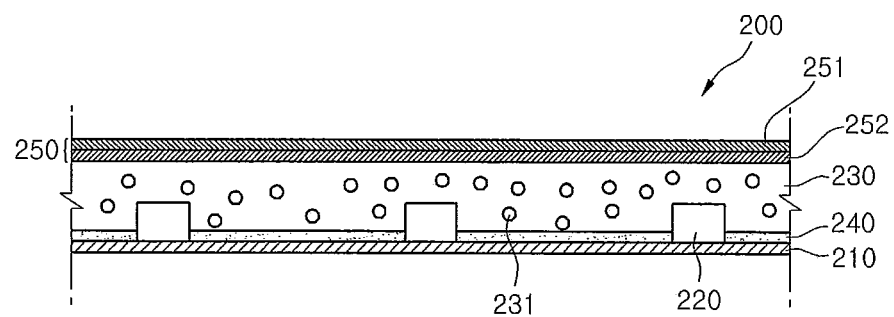
FIG. 4 is a cross-sectional view illustrating a configuration of a backlight unit according to a second embodiment of the present invention.

FIG. 4 is a cross-sectional view illustrating a configuration of a backlight unit according to a second embodiment of the present invention. Description of the same components of the backlight unit 200 shown in FIG. 4 as those explained by referring to FIGS. 2 and 3 will now be omitted.

Referring to FIG. 4, the plurality of light sources 220 can be mounted on the substrate 210 and the resin layer 230 can be disposed on the top of the substrate 210. Meanwhile, the reflection layer 240 can be formed between the substrate 210 and the resin layer 230, more particularly, on the top of the substrate 210.

Further, as shown in FIG. 4, the resin layer 230 can include a plurality of scattering particles 231 and the scattering particles 231 can more widely diffuse the light emitted from the light source 220 by scattering or refracting incident light.

The scattering particles 231 can be made of a material having a refractive index different from the material configuring the resin layer 230, more particularly, a material having a refractive index higher than the silicon-type or acrylic resin configuring the resin layer 230 so as to scatter or refract the light emitted from the light source 220.

For example, the scattering particles 231 can be configured by polymethylmethacrylate/styrene copolymer (MS), polymethylmethacrylate (PMMA), polystyrene (PS), silicon, titanium dioxide ($TiO_2$), silicon dioxide ($SiO_2$), etc. and can be configured by combining the materials.

Meanwhile, the scattering particles 231 can be configured even by a material having a refractive index lower than the material configuring the resin layer 230 and for example, can be configured by forming the bubble in the resin layer 230.

Further, the material configuring the scattering particle 231 is not limited to the above-mentioned materials and the scattering particle 231 can be configured by using various polymer materials or inorganic particles other than the above-mentioned materials.

According to the embodiment of the present invention, the resin layer 230 can be formed by mixing the scattering particles 231 with the liquid-type or gel-type resin, and applying them onto the top of the first layer 210 where the plurality of light sources 220 and the reflection layer 230 are formed.

Referring to FIG. 4, an optical sheet 250 can be disposed on the top of the resin layer 230 and for example, the optical sheet 250 can include a prism sheet 251 and a diffusion sheet 252.

In this case, a plurality of sheets included in the optical sheet 250 are provided with being closely contacted with each other without being separated from each other, such that it is possible to minimize the thickness of the optical sheet 250 or the backlight unit 200.

Meanwhile, the bottom of the optical sheet 250 can be closely contacted to the resin layer and the top of the optical sheet 250 can be closely contacted onto the bottom of the display panel 100, more particularly, on the lower polarizer 140.

The diffusion sheet 252 prevents light emitted from the resin layer 230 from being partially focused by diffusing the incident light to thereby making the luminance of the light uniform. Further, the prism sheet 251 allows the light to be vertically inputted into the display panel 100 by focusing the light emitted from the diffusion sheet 252.

According to another embodiment of the present invention, the optical sheet 250, for example, at least one of the prism sheet 251 and the diffusion sheet 252 can be removed or the optical sheet 250 can be configured by including various function layers in addition to the prism sheet 251 and the diffusion sheet 252.

Further, a plurality of holes (not shown) may be formed at positions of the reflection layers 240 corresponding to the plurality of light sources and the plurality of light sources 220 mounted on the lower substrate 210 may be inserted into the holes.

In this case, the light sources 220 are inserted in a lower part through the holes formed in the reflection layer 240 and at least some of the light sources 220 may protrude on the top of the reflection layer 240.

As such, it is possible to further improve fixation force between the substrate 210 mounted with the light sources 220 and the reflection layer 240 by configuring the backlight unit 200 by using the structure in which the light sources 220 are inserted into the holes of the reflection layer 240.

Figure 5:
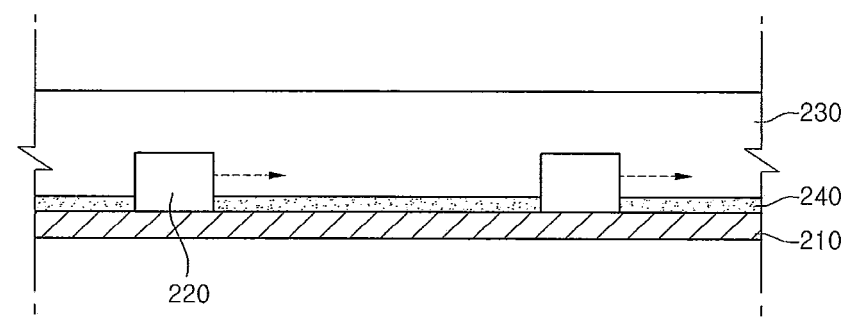
FIG. 5 is a cross-sectional view illustrating a configuration of a backlight unit according to a third embodiment of the present invention.

FIG. 5 is a cross-sectional view illustrating a configuration of a backlight unit according to a third embodiment of the present invention. Description of the same components of the backlight unit 200 shown in FIG. 5 as those explained by referring to FIGS. 2 and 4 will now be omitted.

Referring to FIG. 5, each of the plurality of light sources 220 provided in the backlight unit 200 has the light emitting surface on the side surface thereof and can emit light in a lateral direction, that is, a direction in which the substrate 210 or the reflection layer 240 extends.

For example the plurality of light sources 220 can be configured by using the side view-type LED package. As a result, it is possible to reduce a problem that the light source 220 is observed as a hot spot on a screen and slim the backlight unit 200, furthermore, the display apparatus by reducing the thickness (a) of the resin layer 230.

In this case, the light source 220 can emit light having an orientation angle of, for example, 90 to 150 degrees centering on a first direction (indicated by an arrow).

Figure 6:
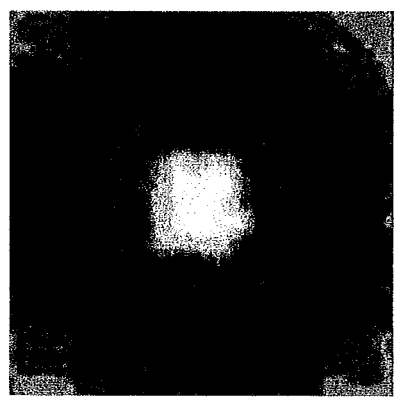
FIG. 6 is a diagram illustrating one example of a hot spot generated in a backlight unit.

Referring to FIG. 6, the density of light concentrates on an area adjacent to the light source 220 by light emitted upwards from the light source 220, such that a hot spot having luminance higher than a neighboring area may be generated.

The luminance of light provided to the display panel 100 from the backlight unit may be nonuniform due to the hot spot generated in the area adjacent to the light source 220, thereby deteriorating an image quality of the display picture.

Further, as the thickness (a) of the resin layer 230 decreases, a possibility that the hot spot phenomenon will be generated may further increase and for example, as described above, when the thickness (a) of the resin layer 230 is in the range of 0.1 to 4.5, the hot spot may be generated in the area adjacent to the light source 220.

According to the embodiment of the present invention, a reflection pattern is formed on the top of the resin layer 230 to reflect and diffuse light upwards from the light source, thereby emitting light having uniform luminance from the backlight unit 200.

FIGS. 7 to 10 are cross-sectional views illustrating configurations of a backlight unit according to a fourth embodiment of the present invention. A description of the same components of the backlight unit 200 shown in FIGS. 7 to 10 as the components explained by referring to FIGS. 1 to 5 will now be omitted.

Figure 7:
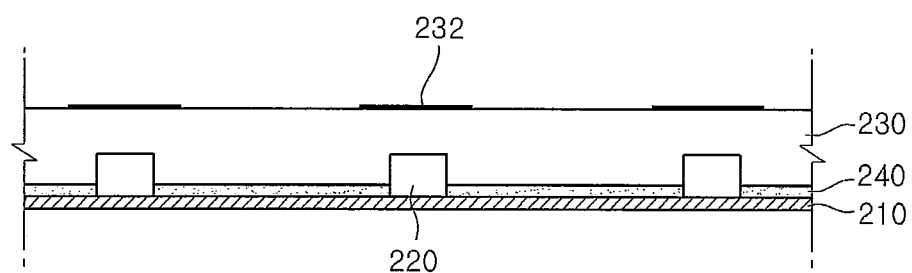
FIGS. 7 to 10 are cross-sectional views illustrating configurations of a backlight unit according to a fourth embodiment of the present invention.

Referring to FIG. 7, the pattern layer including a plurality of patterns 232 may be formed on the top of the resin layer 230. More specifically, the plurality of patterns 232 included in the pattern layer may be formed on the resin layer 230 to correspond to the position where the light source 220 is disposed.

For example, the patterns 232 formed on the top of the resin layer 230 may be a reflection pattern that reflects at least part of light emitted from the light source 220.

As shown in FIG. 7, it is possible to reduce the luminance of light emitted from an area adjacent to the light source 220 by forming the reflection pattern 232 on the resin layer 230, thereby causing the backlight unit 200 to emit light having uniform luminance.

That is, the reflection pattern 232 is formed on the resin layer 230 to correspond to the position where the plurality of light sources to reduce the luminance of light emitted from the area emitted from the light source 220 by reflecting light emitted from the top. The reflected light may be diffused to a lateral direction.

More specifically, the light emitted upward from the light source 220 is reflected downwards while being diffused in the lateral direction by the reflection pattern 232 and the light reflected on the reflection pattern 232 may be reflected upwards while being diffused in the lateral direction by the reflection layer 240 again.

As a result, the light emitted from the light source 220 can be widely diffused in the lateral direction without concentrating on the upper direction so as to allow the backlight unit 200 to emit the light having the uniform luminance.

The reflection pattern 232 includes a reflection material such as metal, etc. For example, the reflection pattern 232 may include metal such as aluminum, silver, gold, or the like having reflectance of 90% or more.

In this case, the reflection pattern 232 may be formed by depositing or coating the metal. As another method, the reflection pattern 232 may be formed by performing a printing operation using reflection ink including the metal, for example, silver ink in accordance with a predetermined pattern.

Further, in order to improve a reflection effect of the reflection pattern 232, a color of the reflection pattern 232 may have a color close to a color having high brightness, for example, a white color. More specifically, the reflection pattern 232 may have a color having higher brightness than the resin layer 230.

Meanwhile, the reflection pattern 232 may include metal oxide. For example, the reflection pattern 232 may include titanium dioxide ($TiO_2$). More specifically, the reflection pattern 232 may be formed by performing the printing operation using reflection ink including titanium dioxide ($TiO_2$).

Figure 8:
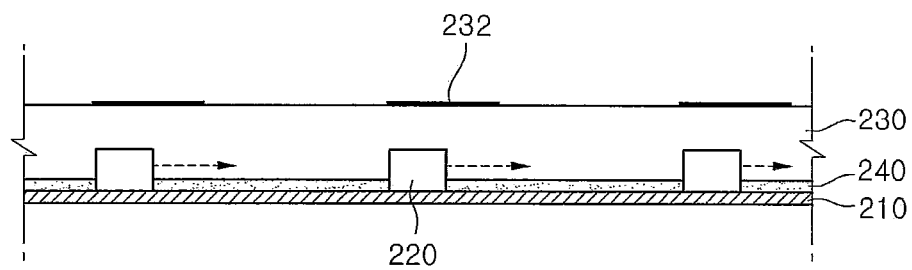

According to another embodiment of the present invention, as shown in FIG. 8, the center of the reflection pattern 232 may not coincide with the center of the light source.

That is, when the light emitting surface of the light source 220 faces not the upper direction but the lateral direction and therefore, light is emitted from the light source 220 in the lateral direction, a first area adjacent to a direction facing the light emitting surface of the light source 220 may have higher luminance than adjacent areas, while a second area adjacent to a direction opposite to the light emitting surface may have lower luminance of light than the first area. Therefore, the reflection pattern 232 may be formed by moving in a direction (indicated by an arrow) of light emitted from the light source 220.

Therefore, the center of the reflection pattern 232 may be formed at a position slightly deviated from the center of the light source 220 in the light emitting direction.

Figure 9:
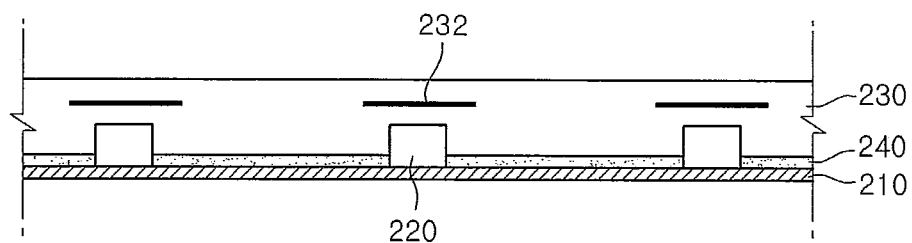

According to yet another embodiment of the present invention, as shown in FIG. 9, the reflection pattern 232 may be formed in the resin layer 230.

Figure 10:
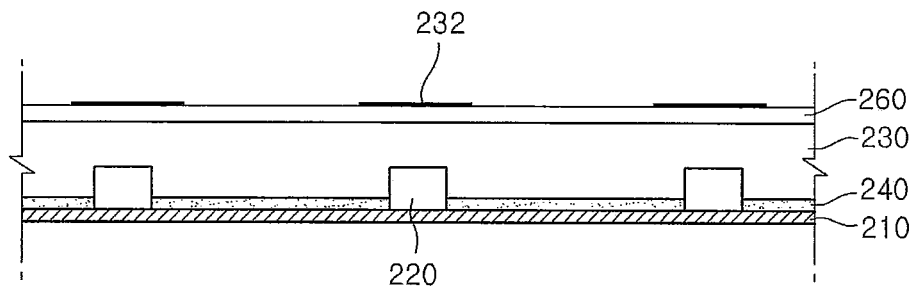

Referring to FIG. 10, the reflection pattern 232 may be manufactured in a sheet form. In this case, the pattern layer including the plurality of reflection patterns 232 may be formed on the resin layer 230.

For example, after the pattern layer is configured by forming the plurality of reflection patterns 232 on one surface of a transparent film 260 through printing, etc., the pattern layer may be formed on the resin layer 230. More specifically, the reflection pattern 232 may be formed by printing the transparent film with a plurality of dots.

Meanwhile, as a ratio of an area where the reflection pattern 232 is formed in the resin layer 230 increases, an opening ratio decreases, such that the overall luminance of light provided from the backlight unit 200 to the display panel 100 may decrease.

Therefore, in order to prevent the image quality of the display picture from being deteriorated due to a rapid decrease in luminance of the light provided to the display panel 100, the opening ratio of the pattern layer on which the reflection pattern 232 is formed is preferably 70% or more. That is, the opening area where the reflection pattern is formed in the resin layer 230 preferably occupies 70% or more of the entire area.

Figure 11:
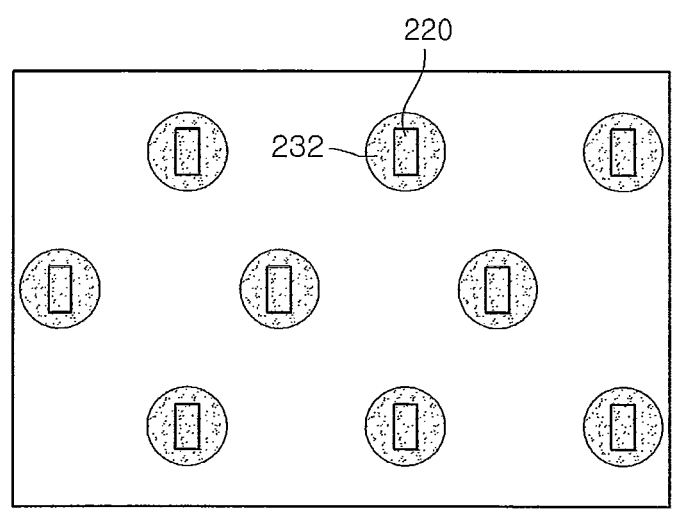
FIG. 11 is a plan view illustrating one embodiment of placement of a pattern formed in a backlight unit.

FIG. 11 is a plan view illustrating one embodiment of placement of a pattern formed in a backlight unit. As described above, the reflection pattern 232 may be formed to correspond to the area where the light source 220 is formed.

For example, as shown in FIG. 11, the reflection pattern 232 may have a cylinder shape or an oval shape centering on the position where the light source 220 is formed.

FIGS. 12A to 14 are diagram illustrating embodiments of a shape of a pattern. The reflection pattern 232 may be configured by a plurality of dots each including a reflection material, for example, metal or metal oxide.

Figure 12A:
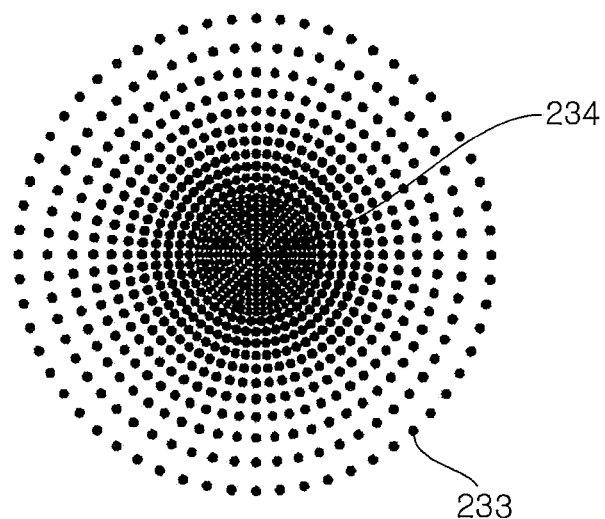
FIGS. 12A to 14 are diagram illustrating embodiments of a shape of a pattern.

Referring to FIG. 12A, the reflection pattern 232 may have the cylinder shape centering on the area where the light source 220 is formed and reflectance may decrease outwards from a center 234. Further, light transmittance or an opening ratio of the reflection pattern 232 may increase outwards from the center 234.

As a result, the position where the light source 220 is formed, more specifically, the center 234 of the reflection pattern 232 corresponding to the center of the light source 220 may have the highest reflectance and the lowest transmittance or opening ratio. Therefore, it is possible to more effectively prevent the hot spot from being generated due to concentration of light on the area where the light source 220 is formed.

For example, in order to prevent the hot spot from being generated, an opening ratio of an area of the pattern 232 which superimposes on the light source 220 is preferably 5% or less.

Meanwhile, in case of the plurality dots 233 constituting the reflection pattern 232, gaps between adjacent dots 233 may increase outwards from the center 234 and as a result, the transmittance or the opening ratio increases while the reflectance decreases outwards from the center 234 of the reflection pattern 232 as described above.

Figure 12B:
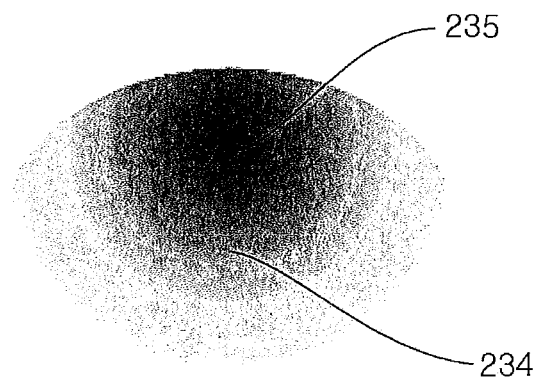

Meanwhile, referring to FIG. 12B, the reflection pattern 232 may have the oval shape.

Further, as shown in FIG. 12B, the center 234 of the reflection pattern 232 may not coincide with the center of the light source.

That is, as described by referring to FIG. 8, the center 234 of the reflection pattern 232 may be formed at a position slightly deviated from the center of the light source in one direction, for example, the direction of light emitted from the light source 220.

In this case, the reflectance may decrease or the transmittance may increase outwards from a portion 235 of the reflection pattern 232 corresponding to the center of the light source 220.

That is, the portion 235 of the reflection pattern 232 corresponding to the center of the light source 220 may be positioned deviated from the center 234. The portion 235 of the reflection 234 corresponding to the center of the light source 220 may have the highest reflectance or the lowest transmittance.

Figure 13:
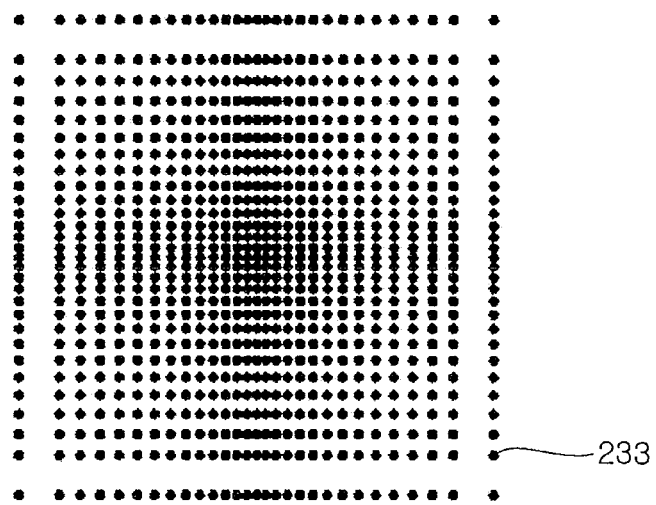
Figure 14:
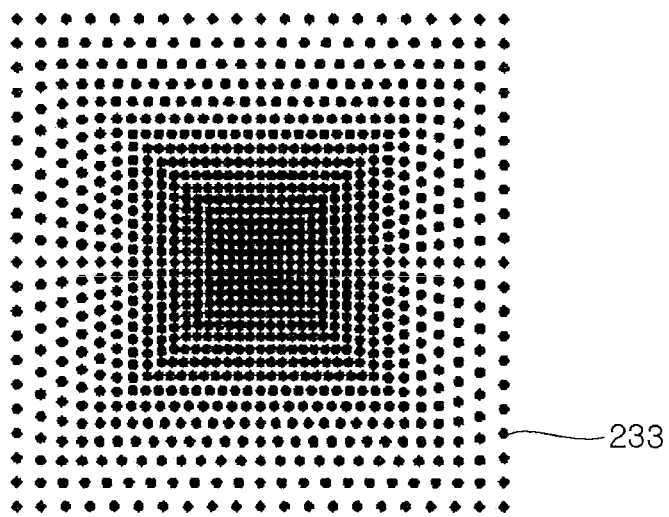

Referring to FIGS. 13 and 14, the reflection pattern 232 may have the rectangle shape centering on the area where the light source 220 is formed and may have reflectance decreased and an opening ratio increased outwards from the center thereof.

Even in this case, in order to prevent the hot spot from being generated, a central area of the reflection pattern 232 which superimposes on the light source 220 preferably has an opening ratio of 5% or less.

Meanwhile, as shown in FIGS. 13 and 14, in case of the plurality of dots 233 constituting the reflection pattern 232, a gap between adjacent dots 233 may increase outwards from the center.

Figure 15:
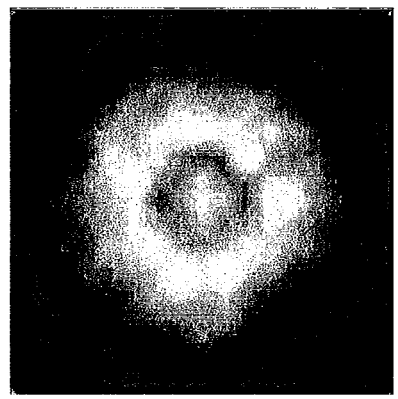
FIGS. 15 to 17 are diagrams illustrating embodiments of distribution of light emitted from a backlight unit.
Figure 16:
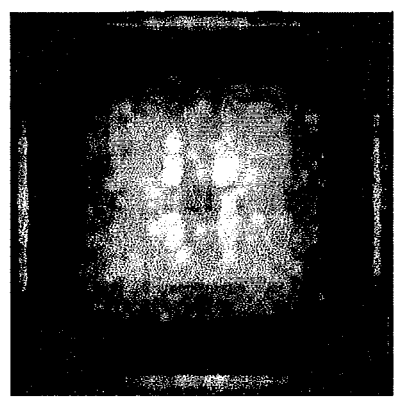
Figure 17:
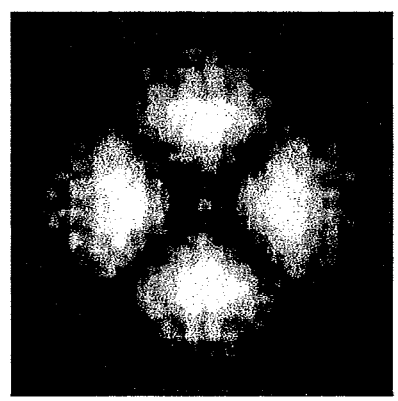

FIGS. 15 to 17 are diagrams illustrating embodiments of distribution of light emitted from a backlight unit. FIG. 15 illustrates a case in which the reflection pattern 232 having the shape shown in FIG. 12A is formed on the top of the resin layer 230. FIG. 16 illustrates a case in which the reflection pattern 232 having the shape shown in FIG. 13 is formed on the top of the resin layer 230. FIG. 17 illustrates a result of measuring light distribution in case in which the reflection pattern 232 having the shape shown in FIG. 14 is formed on the top of the resin layer 230.

Referring to FIGS. 15 to 17, the hot spot phenomenon in which light density concentrates on the area adjacent to the light source 220 is reduced.

Meanwhile, in the above description, although the case in which the reflection pattern 232 includes the plurality of dots by referring to FIGS. 12A to 17, the present invention is not limited thereto and the reflection pattern 232 may have various structures in which the reflectance decreases and the transmittance or the opening ratio increases outwards from the center thereof.

For example, the concentration of the reflection material, for example, the metal or metal oxide may decrease outwards from the center of the reflection pattern 232. As a result, it is possible to prevent the light density from concentrating on the area adjacent to the light source due to the decrease of the reflectance and the increase of the transmittance or the opening ratio.

Figure 18:
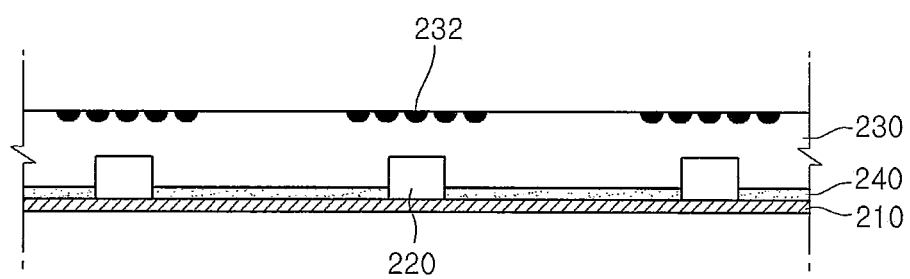
FIGS. 18 and 19 are cross-sectional views illustrating a configuration of a backlight unit according to a fifth embodiment of the present invention.
Figure 19:
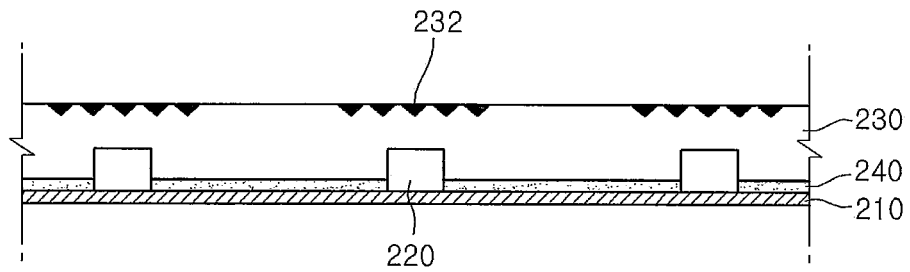

FIGS. 18 and 19 are cross-sectional views illustrating a configuration of a backlight unit according to a fifth embodiment of the present invention. A description of the same components of the backlight unit 200 shown in FIGS. 18 to 19 as the components explained by referring to FIGS. 1 to 17 will now be omitted.

Referring to FIG. 18, the reflection pattern 232 may have a convex shape toward the light source 220. For example, the reflection pattern 232 may have a shape similar to a semicircle.

Meanwhile, a cross-sectional shape of the reflection pattern 232 may have the semicircle shape or the oval shape convexed toward the light source 220 as shown in FIG. 18.

The reflection pattern having the convex shape can reflect incident light at various angles. Therefore, it is possible to make the luminance of light emitted upwards from the resin layer 230 more uniform by diffusing the light emitted from the light source 220 more widely.

The reflection pattern 232 may include the reflection material such as metal, metal oxide, or the like as described above. For example, the reflection pattern 232 may be formed by forming a pattern on the top of the resin layer 230 by an intaglio method and filling the intaglio pattern with reflection material.

Alternatively, by printing a film-shaped sheet with the reflection material or attaching beads or metallic particles to the film-shaped sheet and thereafter, pressing the film onto the resin layer 230, the reflection pattern 232 shown in FIG. 15 may be formed on the top of the resin layer 230.

Meanwhile, a cross-sectional shape of the reflection pattern 232 may have various shapes protruding toward the light source 220 in addition to a shape similar to the semicircle shape shown in FIG. 15.

For example, as shown in FIG. 19, the cross-sectional shape of the reflection pattern 232 may have a triangle shape protruding toward the light source 220. In this case, the reflection pattern 232 may have a pyramid shape or a prism shape.

Further, as shown in FIG. 18 or 19, the reflection pattern 232 having the shape protruding toward the light source 220 may be disposed to have the front shape shown in FIGS. 12A to 14.

That is, the reflection pattern 232 may be disposed to have the cylinder shape or the square shape centering on the position where the light source 220 is formed. The reflection pattern 232 may be disposed to have the reflectance decreased and the transmittance or the opening ratio increased outwards from the center thereof.

For example, in case of the plurality of reflection patterns 232 having the shape protruding toward the light source shown in FIG. 18 or 19, a gap between adjacent reflection patterns 232 may increase outwards from the center, thereby preventing the hot spot from being generated due to concentration of light on the area adjacent to the light source 220.

Figure 20:
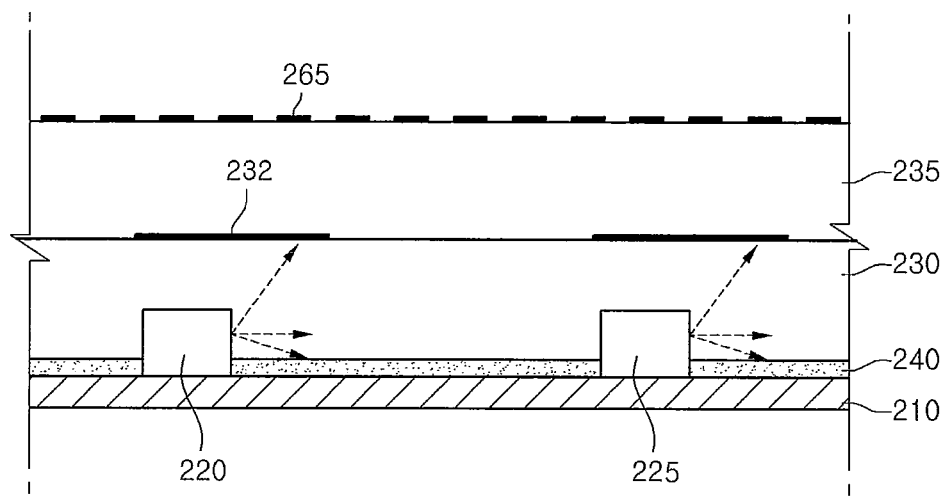
FIG. 20 is a cross-sectional view illustrating a configuration of a backlight unit according to a sixth embodiment of the present invention.

FIG. 20 is a cross-sectional view illustrating a configuration of a backlight unit according to a sixth embodiment of the present invention. The illustrated backlight unit 200 can be configured to include a plurality of resin layers 230 and 235.

Referring to FIG. 20, light emitted from the light source 220 may be emitted upwards by being diffused by the resin layer 230. Further, the resin layer 230 includes the plurality of scattering particles 231 explained by referring to FIG. 4 to scatter or refract the light emitted upwards, thereby making the luminance of the light emitted upwards more uniform.

According to the embodiment of the present invention, the second resin layer 235 may be disposed on the top of the first resin layer 230. The second resin layer 235 can be made of a material similar to or different from the first resin layer 230 and can improve the uniformity of the luminance of the light of the backlight unit 200 by diffusing the light emitted upward from the first resin layer 230.

The second resin layer 235 can be made of a material having the same refractive index as the material configuring the first resin layer 230 or a material having a refractive index different therefrom.

For example, when the second resin layer 235 is made of a material having a refractive index higher than the first resin layer 230, the second resin layer 235 can more widely diffuse the light emitted from the first resin layer 230.

In contrast, when the second resin layer 235 is made of a material having a refractive index lower than the first resin layer 230, it is possible to improve reflectivity in which the light emitted from the first resin layer 230 is reflected on the bottom of the second resin layer 235, thereby allowing the light emitted from the light source 220 to easily advance along the first resin layer 230.

Meanwhile, the second resin layer 235 may also include a plurality of scattering particles 236. In this case, the density of the scattering particles 236 included in the second layer 235 may be higher than the density of scattering particles 231 included in the first resin layer 230.

As described above, it is possible to more widely diffuse the light emitted upward from the first resin layer 230 by including the scattering particles in the second resin layer 235 with higher density, thereby making the luminance of the light emitted from the backlight unit 200 more uniform.

According to the embodiment of the present invention, the reflection pattern 232 explained by referring to FIGS. 7 to 19 may be formed between the first resin layer 230 and the second resin layer 235.

Further, as shown in FIG. 20, another pattern layer may be formed on the top of the second resin layer 235 and the pattern layer formed on the second resin layer 235 may also include a plurality of patterns.

The pattern 265 on the top of the second resin layer 235 may be a reflection pattern that reflects at least part of light emitted from the first resin layer 230. Therefore, it is possible to make the luminance of light emitted from the second resin layer 235 uniform.

For example, when the light emitted upward from the second resin layer 235 is focused on a predetermined part and is thus observed on the screen with high luminance, the pattern 265 may be formed in a region corresponding to the predetermined part of the top of the second resin layer 235. Therefore, it is possible to make the luminance of the light emitted from the backlight unit 200 uniform by reducing the luminance of the light in the predetermined part.

The pattern 265 may be made of titanium dioxide ($TiO_2$). In this case, a part of the light emitted from the second resin layer 235 may be reflected downward and the rest part can be transmitted in the second light shielding pattern 265.

Figure 21:
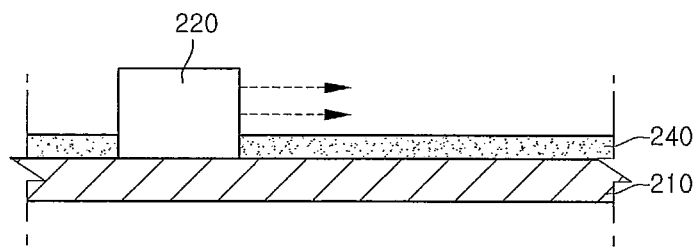
FIGS. 21 and 22 are cross-sectional views for explaining a positional relationship between a light source and a reflection layer that are provided in a backlight unit.
Figure 22:
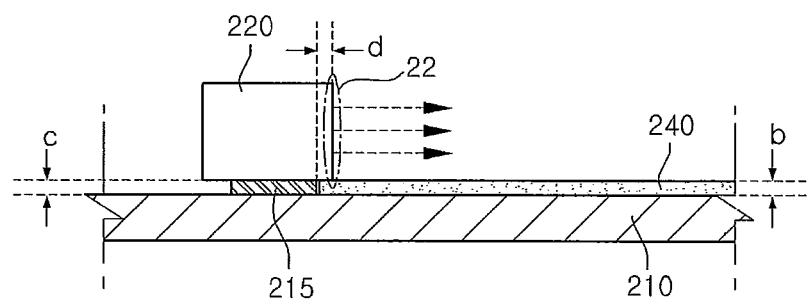

FIGS. 21 and 22 are diagrams for explaining a positional relationship of a light source 220 and a reflection layer 240 that are provided in a backlight unit 200. A description of the same components of the illustrated backlight unit 200 as those explained by referring to FIGS. 2 to 20 will now be omitted.

Referring to FIG. 21, as the reflection layer 240 is disposed on the side of the light source 220, a part of light emitted to the side from the light source 220 is inputted into the reflection layer 240 to be lost.

The loss of the light emitted from the light source 220 decreases the amount of the light that advances by being inputted into the resin layer 230. As a result, the amount of light provided from the backlight unit 200 to the display panel 100 is decreased, such that the luminance of the display picture can be decreased.

According to the embodiment of the present invention, as shown in FIG. 22, it is preferable that the light source 220 is positioned above the reflection layer 240. As a result, the light emitted from the light source 220 advances along the resin layer 230 and can be emitted upward without being lost by the reflection layer 240.

For example, a support member 215 can be formed between the light source 220 and the substrate 210 and the light source 220 can be supported and fixed onto the substrate 210 by the support member 215.

The support member 215 can be configured by metal having electric conductivity and for example, can be configured by a metallic material including plumbum (Pb). More specifically, the support member 215 can be a solder pad for soldering the light source 220 onto the substrate 210.

The thickness (b) of the reflection layer 240 can be equal to or smaller than the thickness (c) of the support member 215. Therefore, the light source 220 can be positioned above the reflection layer 240.

Meanwhile, as the thickness (c) of the support member 215, i.e., the solder pad increases, resistance increases, such that since power supplied to the light source 220 can be lost, the thickness (c) of the support member 215 is preferably equal to or less than 0.14 mm. Therefore, the thickness (b) of the reflection layer 240 can also be equal to or less than 0.14 mm which is the maximum value of the thickness (c) of the support member 215.

Further, as the thickness of (b) of the reflection layer 240 decreases, the light reflectance of the reflection layer 240 can decrease, that is, a part of the light inputted from the light source 220 may be transmitted downward without being reflected at a predetermined thickness or less.

Therefore, the reflection layer 240 is positioned above the light source 220, such that the thickness (b) of the reflection layer 240 can be formed with 0.03 to 0.14 mm in order to reflect most of the light inputted from the light source 220 while improving the incident efficiency of the light.

Further, as shown in FIG. 22, a part of the reflection layer 240 can be inserted below the light source 220, more specifically, between the light source 220 and the substrate 210, thereby more certainly prevent the light emitted from the light source 220 from being lost by the reflection layer 240. For this, the support member 215 can be inserted from the end of the light source 220 by a predetermined distance (d).

Meanwhile, as the insertion distance (d) of the support member 215 decreases, the size of a part of the reflection layer 240 inserted into the bottom of the light source decreases to cause the stability of a structure in which the reflection layer 240 is inserted from deteriorating. Further, as the insertion distance (d) of the support member 215 increases, the light source 220 may unstably be support to the support member 215.

Accordingly, in order to improve the stability of the insertion structure of the reflection layer 240 and the support structure of the light source 220, the insertion distance (d) of the support member 215 is preferably in the range of 0.05 to 0.2 mm.

According to yet another embodiment of the present invention, the light source 220 can include a head part 22 emitting light in a lateral direction and a body part having an attaching surface for allowing the light source 220 to be mounted on the substrate 210, etc. Further, the head part 22 of the light source 220 can include a light emitting surface which actually emits light and a non-emitting surface that does not emit light on the outer periphery of the light emitting surface.

In this case, the light emitting surface of the head part of the light source 220 is preferable positioned above the reflection layer 240. Therefore, it is possible to improve the incident efficiency of the light by disabling the light emitted from the light source 220 to be lost by the reflection layer 240.

Figure 23:
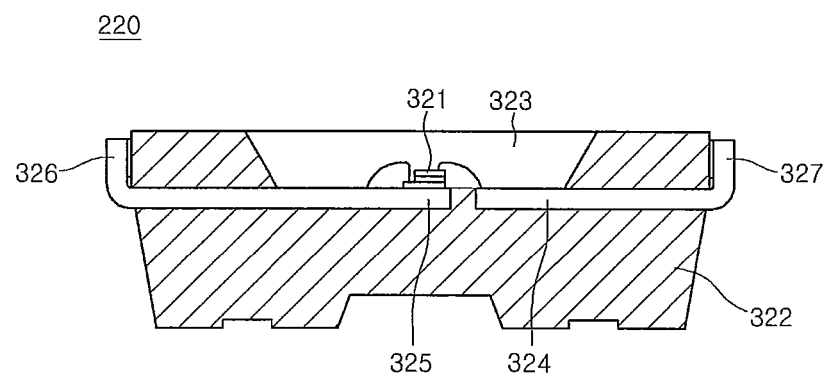
FIGS. 23 and 24 are cross-sectional views illustrating embodiments of a structure of a light source.
Figure 24:
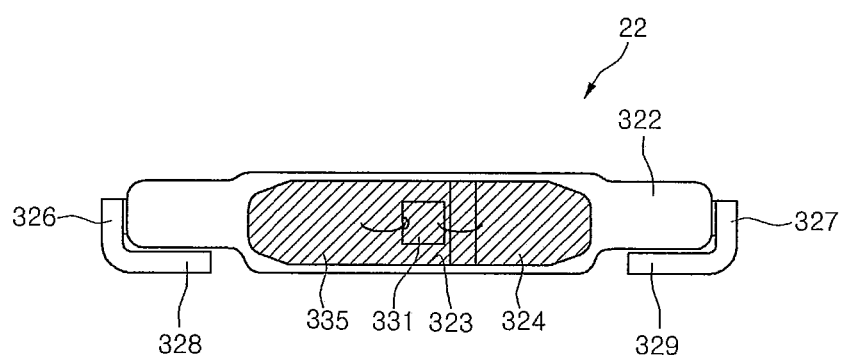

FIGS. 23 and 24 are diagrams illustrating one embodiment for a structure of a light source 200 provided in a backlight unit. FIG. 23 illustrates the structure of the light source 220 seen from the side and FIG. 24 illustrates of a structure of a head part 22 of the light source 220 seen from the front.

Referring to FIG. 23, the light source 220 can be configured to include a light emitting device 321, a mold part 322 having a cavity 323, and a plurality of lead frames 324 and 325. According to the embodiment of the present invention, the light emitting device 321 may be a light emitting diode (LED) chip and the LED chip may be configured by a blue LED chip or an infrared ray LED chip or by at least one or a package type combining one or more chips of a red LED chip, a green LED chip, a blue LED chip, a yellow green LED chip, and a white LED chip.

Hereinafter, the embodiment of the present invention will be described by using a case in which the light source 220 is configured to include the LED chip 321 as the light emitting device emitting light as an example.

The LED chip 321 is packaged to the mold part 322 configuring a body of the light source 220. For this, the cavity 323 can be formed at one side of the center of the mold part 322. Meanwhile, the mold part 322 can be injection-molded with a resin material such as polyphtalamide (PPA), etc. to a press (Cu/Ni/Ag substrate) and the cavity 323 of the mold part 322 can serve as a reflection cup. The shape or structure of the mold part 322 shown in FIG. 9 may be changed and is not limited thereto.

The plurality of lead frames 324 and 325 penetrate in a long axis direction of the mold part 322. Ends 326 and 327 of the lead frames can be exposed to the outside. Herein, a long-direction symmetrical axis of the mold part 322 is referred to as a long axis and a short-direction symmetrical axis of the mold part 322 is referred to as a short axis as viewed from the bottom of the cavity 323 where the LED chip 321 is disposed.

Semiconductor devices such as a light receiving device, a protection device, etc. may selectively be mounted on the lead frames 324 and 325 in the cavity 323 in addition to the LED chip 321. That is, the protection device such as a zener diode, etc. for protecting the LED chip 321 from static electricity, etc. (ESD: electro static discharge) may be mounted on the lead frames 324 and 325 in addition to the LED chip 321.

The LED chip 321 adheres to any one lead frame 325 positioned on the bottom of the cavity 323 and thereafter, the LED chip 321 can be connected by wire bonding or flip chip bonding.

Further, after the LED chip 321 is connected, a resin material (not shown) is molded to the mounting region in the cavity 323. The resin material includes a silicon or epoxy material. Phosphor may selectively be added to the resin material. The resin material can be formed in any one shape of a flat shape in which the surface of the resin material is molded with the same height as the top of the cavity 323, a concave lens shape concaved to the top of the cavity 232, and a convex lens shape convexed to the top of the cavity 323.

At least one side of the cavity 323 is inclined and the side may serve as a reflection surface (not shown) or a reflection layer. The cavity 323 may have a polygonal exterior shape and may have shapes other than a polygonal shape.

Referring to FIG. 24, the head part 22 of the light source 220 which is a part emitting the light can include a light emitting surface (displayed by an oblique line) actually emitting the light and a non-emitting surface not emitting the light, which is a part other than the light emitting surface.

More specifically, the light emitting surface of the head part 22 of the light source 220, which emits the light is formed by the mold part 322 and can be defined by the cavity 323 disposed in the LED chip 321. That is, the LED chip 321 is disposed in the cavity 323 of the mold part 322, such that the light emitted from the LED chip 321 can be emitted through the light emitting surface surrounded by the mold part 322. Further, the non-emitting surface of the head part 22 of the light source 220 may be a part (not displayed by the oblique line) where the mold part 322 is formed and the light is not emitted.

Further, as shown in FIG. 24, the light emitting surface of the head part 22 of the light source 220 has a shape in which a horizontal length is longer than a vertical length. However, the shape of the light emitting surface of the head part 22 is not limited to the shape shown in FIG. 24. For example, the light emitting surface may have a rectangular shape.

In addition, the non-emitting surface that does not emit the light may be positioned at upper, lower, left, or right side of the light emitting surface of the head part 22 of the light source 220.

Meanwhile, the ends of 326 and 327 of the lead frames 324 and 325 extend to the outer frame of the mold part 322 to be firstly formed and secondly formed in one groove of the mold part 322 to be disposed in first and second lead electrodes 328 and 329. Herein, the number of forming times may be changed and is not limited thereto.

The first and second lead electrodes 328 and 329 of the lead frames 324 and 325 can be formed to be received in grooves formed at both sides of the bottom of the mold part 322. Further, the first and second lead electrodes 328 and 329 are formed with a plate structure having a predetermined shape and may be formed with a shape in which solder bonding is easy in surface mounting.

Figure 25:
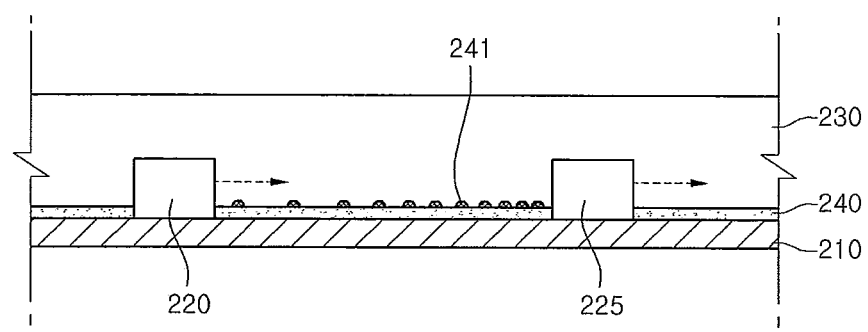
FIG. 25 is a cross-sectional view illustrating a configuration of a backlight unit according to a seventh embodiment of the present invention.

FIG. 25 is a cross-sectional view illustrating a configuration of a backlight unit according to a seventh embodiment of the present invention. Description of the same components of the backlight unit 200 shown in FIG. 25 as those explained by referring to FIGS. 2 to 24 will now be omitted.

A pattern for allowing the light emitted from the light source 220 to easily advance to the adjacent light source 225 may be formed in the reflection layer 240.

Referring to FIG. 25, the pattern formed on the top of the reflection layer 240 may include a plurality of protrusions 241 and light emitted from the light source 220 and inputted into the plurality of protrusions 241 may be scattered or refracted in the advance direction.

Meanwhile, as shown in FIG. 25, the density of the protrusions 241 formed in the reflection layer 240 may increase as the protrusions 241 are separated from the light source 220, that is, close to the adjacent light source 225.

Accordingly, it is possible to prevent the luminance of the light emitted upward from a region remotely separated from the light source 220, that is, a region close to the adjacent light source 225 from being reduced, thereby maintaining the luminance of the light provided from the backlight unit 200 uniformly.

Further, the protrusions 241 may be made of the same material as the reflection layer 240. In this case, the protrusion 241 can be formed by processing the top of the reflection layer 240.

Unlike this, the protrusions 241 may be made of a material different from the reflection layer 240, for example, the protrusions 241 may be formed on the top of the reflection layer 240 by printing the pattern shown in FIG. 25.

Meanwhile, the shape of the protrusions 241 is not limited to the shape shown in FIG. 25 and for example, may have various shapes such as a prism shape, etc.

According to the embodiment of the present invention, the backlight unit 200 can include two or more light sources that emit light in different directions.

Figure 26:
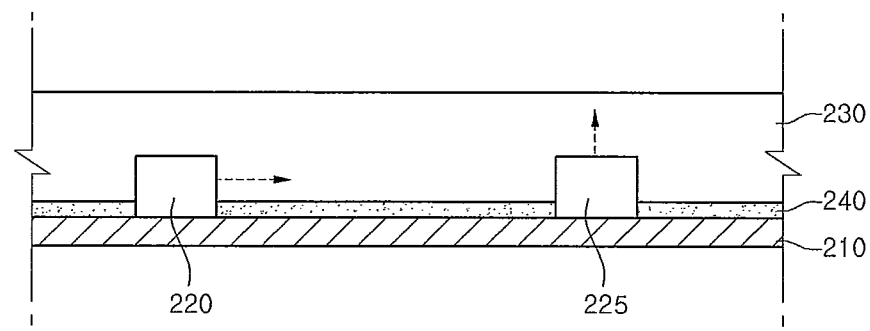
FIG. 26 is a cross-sectional view illustrating one embodiment of structures of a plurality of light sources that are provided in a backlight unit.

FIG. 26 is a cross-sectional view illustrating an embodiment for a structure of a plurality of light sources provided in a backlight unit. The first light source 220 and the second light source 225 of the plurality of light sources provided in the backlight unit 200 may emit light in different directions.

That is, the first light source 220 emits the light in the lateral direction. For this, the first light source 220 can be configured by using the side view-type LED package. Meanwhile, the second light source 225 emits the light in the upward direction. For this, the second light source 225 can be configured by using the top view-type LED package.

As described above, it is possible to prevent light from being focused on a predetermined region or being weakened by configuring the backlight unit 200 by combining two or more light sources that emit the light in different directions. As a result, the backlight unit 200 can provide light having uniform luminance to the display panel 100.

Meanwhile, in FIG. 26, the embodiment of the present invention is described by using a case in which the first light source 220 emitting the light in the lateral direction and the second light source 225 emitting the light in the upward direction are disposed adjacent to each other as an example, but the present invention is not limited thereto. For example, the side view-type light sources may be disposed adjacent to each other or the top view-type light sources may be disposed adjacent to each other.

Figure 27:
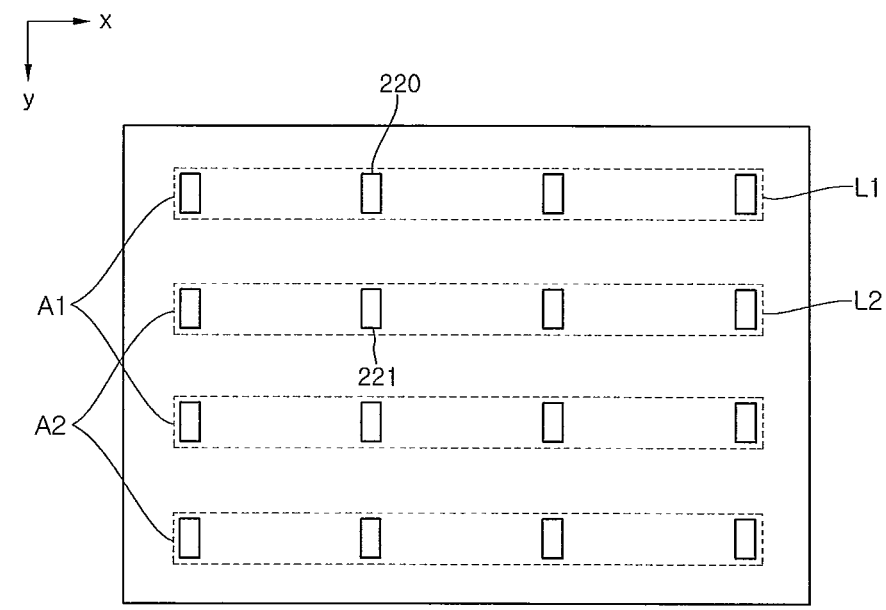
FIGS. 27 to 30 are plan views illustrating embodiments of a structure in which a plurality of light sources are disposed in a backlight unit according to the present invention.

FIG. 27 is a plan view illustrating a front shape of a backlight unit according to an embodiment of the present invention and illustrates an embodiment for a layout structure of a plurality of light sources provided in the backlight unit 200.

Referring to FIG. 27, the plurality of light sources 220 and 221 included in the backlight unit 200 may be disposed by being divided into a plurality of arrays, for example, a first light source array A1 and a second light source array A2.

Meanwhile, the first light source array A1 and the second light source array A2 each include a plurality of light source lines constituting light sources. Light source lines included in the first light source array A1 and light source lines included in the second light source array A2 may be alternately disposed each other.

According to one embodiment of the present invention, the first light source array A1 may include odd number-th light source lines from the top among the plurality of light source lines constituting the plurality of light sources and the second light source array A2 may include even number-th light source lines from the top.

That is, as shown in FIG. 27, a first light source line L1 included in the first light source array A1 and a second light source line L2 included in the second light source array A2 are disposed adjacent to each other and the first light source line L1 and the second light source line L2 are alternately disposed each other to configure the backlight unit 200.

Further, the light source 220 included in the first light source array A1 and the light source 221 included in the second light source array A2 may emit light in the same direction or in different directions.

Figure 28:
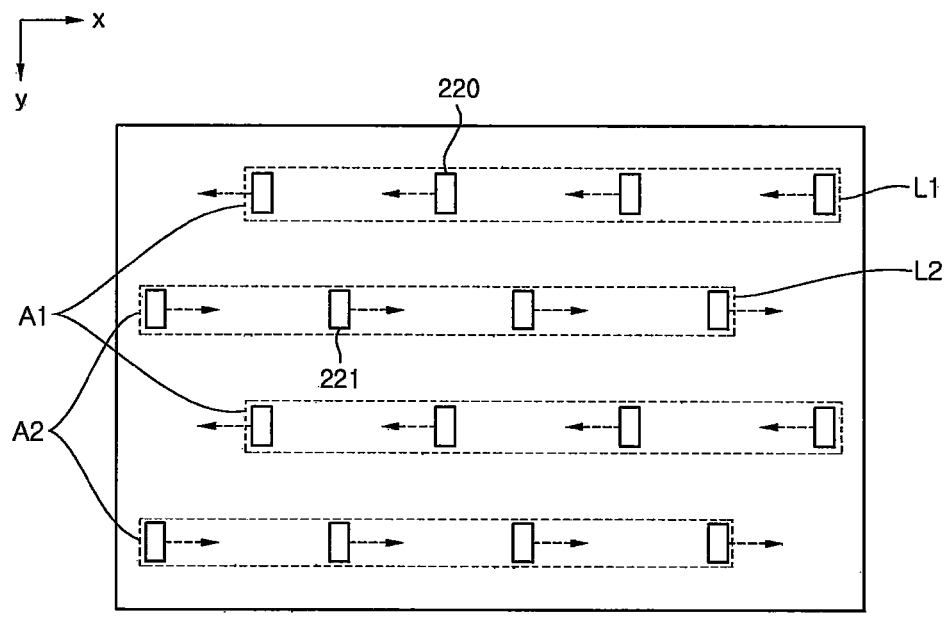

Referring to FIG. 28, the backlight unit 200 may include two or more light sources that emit light in different directions.

That is, the light sources 220 included in the first light source array A1 and the light sources 221 included in the second light source array A2 may emit light in different directions. For this, a direction which light emitting surfaces of the light sources 220 included in the first light source array A1 face may be different from a direction which light emitting surfaces of the light sources 221 included in the second light source array A2 face.

More specifically, the light emitting surface of the first light source 220 included in the first light source array A1 and the light emitting surface of the second light source 221 included in the second light source array A2 may face in different directions. Therefore, as shown in FIG. 28, the first light source 220 included in the first light source array A1 and the second light source 221 included in the second light source array A2 may emit light in different directions.

In this case, the light sources provided in the backlight unit 200 can emit the light in the lateral direction. For this, the light sources can be configured by using the side view-type LED package.

Meanwhile, as shown in FIG. 28, the plurality of light sources provided in the backlight unit 200 can be disposed while forming two or more lines and two or more light sources disposed on the same line can emit the light in the same direction.

For example, light sources right/left adjacent to the first light source 220 can also emit the light in the same direction as the first light source 220, that is, in the direction opposite to the x-axis direction and light sources right/left adjacent to the second light source 221 can also emit the light in the same direction as the second light source 221, that is, in the x-axis direction.

As described above, by forming light emitting directions of the light sources disposed adjacent to each other in the y-axis direction, for example, the first light source 220 and the second light source 221 to be opposite to each other, it is possible to prevent the luminance of the light from being focused or being weakened in a predetermined region of the backlight unit 200.

That is, as the light emitted from the first light source 220 advances to the adjacent light source, the light may be weakened. As a result, as the light is remotely separated from the first light source 220, the luminance of the light emitted in the direction of the display panel 100 may be weakened.

Accordingly, as shown in FIG. 28, by making the light emitting directions of the first light source 220 and the second light source 221 opposite to each other, the first light source 220 and the second light source can complementarily prevent the luminance of the light from being focused in the region adjacent to the light source and the luminance of the light from being weakened in the region remotely separated from the light source, thereby maintaining the luminance of the light emitted from the backlight unit 200 uniformly.

Further, in the first light source line L1 included in the first light source array A1 and the second light source line L2 included in the second light source array A2, right and left positions of the light sources do not coincide with each other but cross each other. As a result, it is possible to improve uniformity of the light emitted from the backlight unit 200.

That is, as shown in FIG. 28, the second light source 221 included in the second light source array A2 may be disposed adjacent to the first light source 220 included in the first light source array A1 in a diagonal direction.

Figure 29:
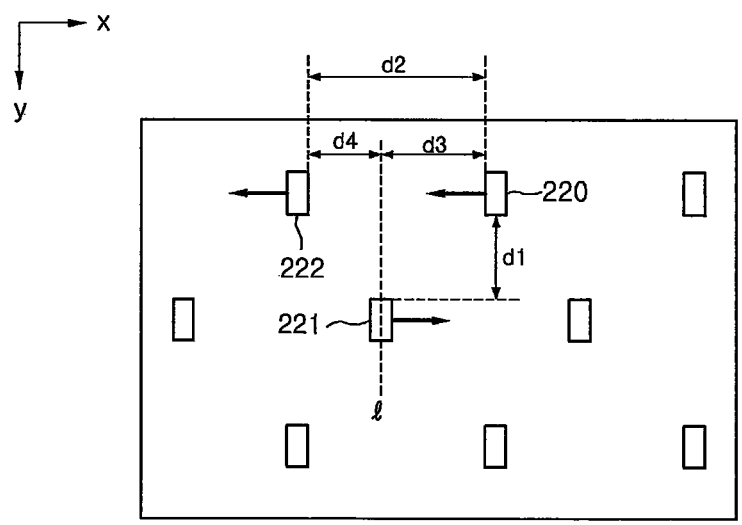
Figure 30:
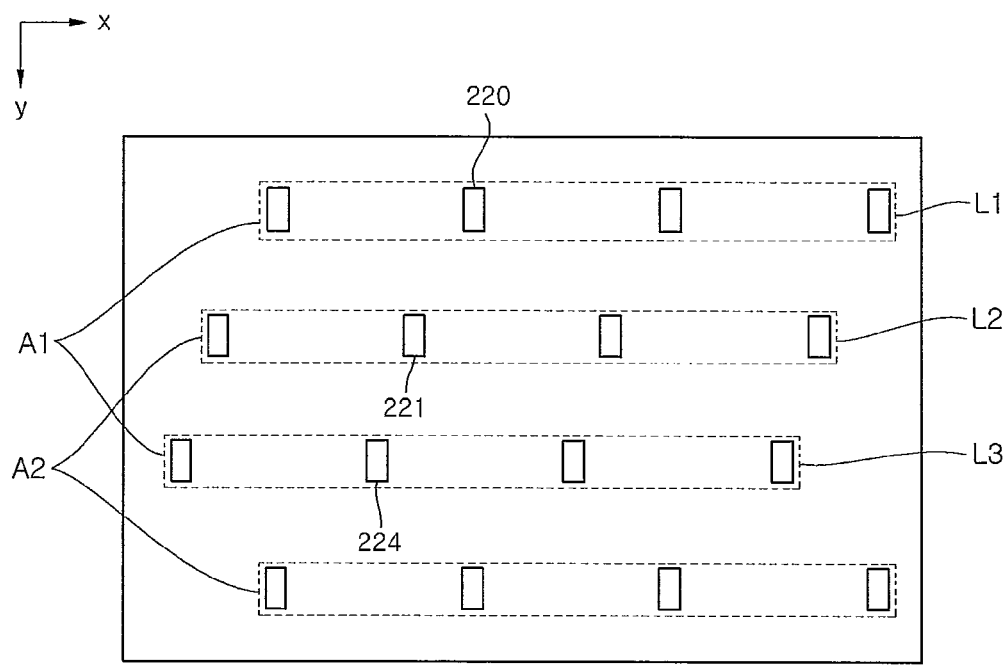

Referring to FIG. 29, two light source lines vertically adjacent to each other, which are included in the first light source array A1 and the second light source array A2, respectively, for example, the first light source line L1 and the second light source line L2 may be separated from each other by a predetermined distance d1. That is, the first light source 220 included in the first light source array A1 and the second light source 221 included in the second light source array A2 may be separated from each other by the predetermined distance d1 on the basis of a y-axis direction vertical to an x-axis in which the light is emitted.

As the distance d1 between the first light and second light source lines L1 and L2 increases, a region which the light emitted from the first light source 220 or the second light source 221 cannot reach may be generated and thus, the luminance of the light in the region may remarkably be weakened.

Meanwhile, as the distance d1 between the first light and second light source lines L1 and L2 decreases, the light emitted from the first light source 220 and the light emitted from the second light source 221 may interfere with each other. In this case, the division driving efficiency of the light sources may be deteriorated.

Accordingly, in order to make the luminance of the light emitted from the backlight unit 200 uniform while reducing the interference of the light resources, the distance d1 of the light source lines, for example, the first and second light source lines L1 and L2 220 and 221, which are adjacent in the same direction crossing the direction in which the light is emitted may be 5 to 22 mm.

Further, the third light source 222 is included in the first light source line of the first light source array A1 and disposed adjacent to the first light source 220 in the x-axis direction and the first light source 220 and the third light source 222 can be spaced from each other by a predetermined distance d2.

Meanwhile, a light orientation angle θ from the light source and a light orientation angle θ' in the resin layer 230 can have a relationship shown in Equation 1 by the Snell's law.

$$\frac{n1}{n2} = \frac{\sin\theta'}{\sin\theta} \quad \text{[Equation 1]}$$

Meanwhile, when a part that emits the light from the light source is an air layer (refractive index n1 is '1') and an orientation angle θ of the light emitted from the light source is generally 60 degrees, the light orientation angle θ' in the resin layer 230 can have a value shown in Equation 2 in accordance with Equation 1.

$$\sin\theta' = \frac{\sin 60°}{n2} \quad \text{[Equation 2]}$$

Further, when the resin layer 230 is made of an acrylic resin type such as polymethyl methacrylate (PMMA), the resin layer 230 has a refractive index of approximately 1.5. Therefore, the light orientation angle θ' in the resin layer 230 can be approximately 35.5 degrees in accordance with Equation 2.

As described by referring to Equations 1 and 2, the light orientation angle θ' of the light emitted from the light source in the resin layer 230 can be less than 45 degrees. As a result, a range in which the light emitted from the light source advances in the y-axis direction can be smaller than a range in which the light advances in the x-axis direction.

Accordingly, the distance d1 between two light sources adjacent to each other in the direction crossing the light emitting direction, that is, the first light source 220 and the second light source 221 can be smaller than the distance d2 between two light sources adjacent to each other in the light emitting direction, that is, the first light source 220 and the third light source 222, thereby maintaining the luminance of the light emitted from the backlight unit 200 uniformly.

Meanwhile, by considering the distance d1 between the light source lines adjacent to each other, which has the above-mentioned range, the distance d2 between two light sources adjacent to each other in the light emitting direction, that is, the first light source 220 and the third light source 222 can be 9 to 27 mm in order to maintain the luminance of the light emitted from the backlight unit 200 uniformly while reducing an interference between the light sources.

Referring to 29, the second light source 221 included in the second light source array A2 may be disposed to correspond to a position between the first light source 220 and the third light source 222 adjacent to each other, which are included in the first light source array A1 in a diagonal direction.

That is, the second light source 221 is disposed adjacent to the first light source 220 and the third light source 222 in the y-axis direction and can be disposed on a straight line l passing between the first light source 220 and the third light source 222.

In this case, a distance d3 between the straight line l on which the second light source 221 is disposed and the first light source 220 can be larger than a distance d4 between the straight line l and the third light source 222.

The light emitted from the second light source 221 advances in a direction orienting the third light source 222 to thereby weakening the luminance of the light emitted in the direction of the display panel 100 in a region adjacent to the third light source 222.

Therefore, by disposing the second light source 221 closer to the third light source 222 than to the first light source 220, it is possible to compensate the decrease in the luminance of the light in the region adjacent to the third light source 222 by using the luminance of the light focused on the region adjacent to the light source 221.

Figure 31:
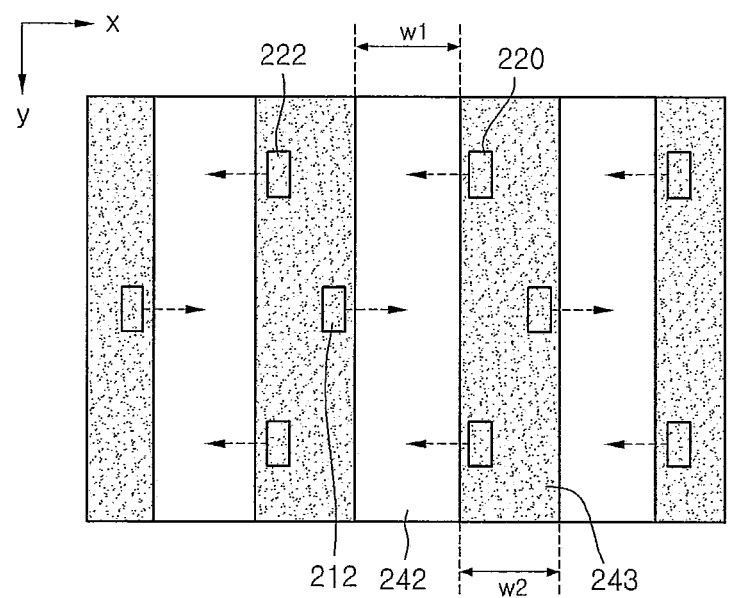
FIG. 31 is a plan view illustrating a first embodiment of a structure of a reflection layer that is provided in a backlight unit according to the present invention.

FIG. 31 is a plan view illustrating a first embodiment of a structure of a reflection layer that is provided in a backlight unit according to the present invention.

The reflection layer 240 provided in the backlight unit 200 according to the embodiment of the present invention can have a reflectance of 2 or more. For example, the reflection layer 240 can be configured to have different reflectances depending on a position where the reflection layer 240 is formed.

Referring to FIG. 31, the reflection layer 240 can include a first reflection layer 242 and a second reflection layer 243 that have different reflectances. The reflection layer 240 can be configured by alternatively disposing the first and second reflection layers 242 and 243 having different reflectances.

For example, the reflectances of the first and second reflection layers 242 and 243 can be implemented to be different by configuring the first and second reflection layers 242 and 243 by reflection sheets made of different materials or by adding a predetermined material to any one of the first and second reflection layers 242 and 243 configured by the same reflection sheet or processing the surface.

According to the embodiment of the present invention, the first and second reflection layers 242 and 243 may be configured by one reflection sheet which is not physically separated. In this case, the first and second reflection layers 242 and 243 having different reflectances may be formed by forming a pattern for adjusting the reflectance in at least a part of the reflection sheet.

That is, it is possible to adjust the reflectance by forming the pattern in at least one area of an area of the reflection layer 240 corresponding to the first reflection layer 242 and an area of the reflection layer 240 corresponding to the second reflection layer 243. For example, by forming the pattern in an area of the reflection layer 240 configured by one sheet corresponding to the second reflection layer 243 shown in FIG. 31, it is possible to adjust the reflectance of the corresponding area.

More specifically, protruded patterns for diffusing light may be formed on the top of the area of the reflection layer 240 corresponding to the second reflection layer 243, thereby reducing the reflectance of the area corresponding to the second reflection layer 243. In this case, a light diffusion effect can be improved in the area of the reflection layer 240 corresponding to the second reflection layer 243. As a result, light emitted from the light source 220 can be uniformly diffused to an area disposed in the adjacent light source 222.

Meanwhile, the first reflection layer 242 of the first and second reflection layers 242 and 243 adjacent to the light sources 220, 221, and 222 can be configured by a specular reflection sheet on the basis of the light emitting direction and the second reflection layer 243 can be configured by a diffuse reflection sheet.

Incident light is reflected on the smooth surface of the specular reflection sheet, such that an incident angle and a reflection angle can be the same as each other. Therefore, the first reflection layer 242 allows light obliquely inputted from the light sources 220, 221, and 222 to advance in a direction orienting the adjacent light source by reflecting the light at the reflection angle equal to the incident angle.

Meanwhile, in the diffuse reflection sheet, the incident light can be observed as reflected and diffused at various angles due to diffused reflection generated on a rough surface with unevenness. Therefore, the second reflection layer 243 can emit upward by diffusing the light advancing after being emitted from the light sources 220, 221, and 222.

According to the embodiment of the present invention, the second reflection layer 243 configured by the diffuse reflection sheet can be formed by forming unevenness by processing the surface of the reflection sheet or applying or adding a diffuse reflection material, i.e., titanium dioxide (TiO2) with predetermined density.

In this case, the reflectance of the first reflection layer 242 can be higher than the reflectance of the second reflection layer 243. Therefore, as described above, the light inputted from the light sources 220, 221, and 222 is specularly reflected at the same reflection angle in the first reflection layer 242 and the diffuse reflection is generated, such that the light can be emitted upward in the second reflection layer 243.

As described above, the light emitted from the light sources 220, 221, and 222 can effectively advance to the adjacent light source by configuring the first reflection layer 242 adjacent to the light sources 220, 221, and 222 by the specular reflection sheet having high reflectance on the basis of the light emitting direction. Therefore, it is possible to prevent the luminance of the light from being focused in the region adjacent to the light sources 220, 221, and 222 and the luminance of the light from being decreased in the region remotely spaced from the light sources 220, 221, and 222.

As described above, the advancing light can effectively be emitted to the display panel 100 by configuring the second reflection layer 243 remotely space from the light sources 220, 221, and 222 by the diffuse reflection sheet having comparatively low reflectance on the basis of the light emitting direction. Therefore, it is possible to prevent the luminance of the light from being decreased in the region remotely spaced from the light sources 220, 221, and 222 by compensating the luminance reduced while the light emitted from the light sources 220, 221, and 222.

According to the embodiment of the present invention, the luminance of the light in the region adjacent to the light sources 220, 221, and 222 and the luminance of the light in the region remotely space from the light sources 220, 221, and 222 can similarly be adjusted. Therefore, it possible to provide the uniform light luminance to the display panel 100 in the entire region of the backlight unit 200.

The width w1 of the first reflection layer 242 adjacent to the light sources 220, 221, and 222 can be larger than the width w2 of the second reflection layer 243 on the basis of the light emitting direction in order to allow the light emitted from the light sources 220, 221, and 222 to the region where the adjacent light source is disposed.

Meanwhile, as the width w1 of the first reflection layer 242 decreases, the progressiveness of the light emitted from the light sources 220, 221, and 222 can be deteriorated. As a result, the luminance of the light in the region remotely spaced from the light sources 220, 221, and 222 can be decreased.

Further, when the width w1 of the first reflection layer 242 is still larger than the width w2 of the second reflection layer 243, the light can be focused in the region remotely spaced from the light sources 220, 221, and 222. For example, the luminance of the light in the middle region between the two adjacent light sources 220 and 222 can be lower than that in the region remotely spaced from the light sources 220, 221, and 222.

Accordingly, the light emitted from the light sources 220, 221, and 222 effectively advances to the region where the adjacent light source is disposed and is emitted upward so as to provide the light having uniform luminance to the display panel 100 in the entire region of the backlight unit 200. For this, the width w1 of the first reflection layer 242 can be 1.1 times to 1.6 times larger than the width w2 of the second reflection layer 243.

Figure 32:
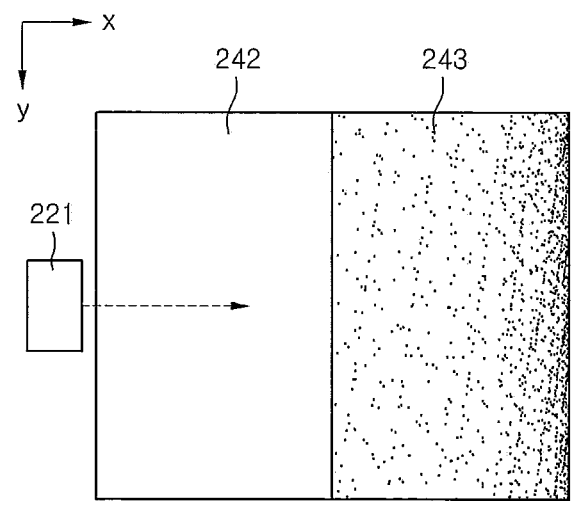
FIG. 32 is a plan view illustrating a second embodiment of a structure of a reflection layer that is provided in a backlight unit according to the present invention.

Referring to FIG. 32, the first light source 220 and the second light source 221 that are disposed adjacent to each other in the y-axis direction can be disposed at a position not overlapped with the first reflection layer 242, that is, outside of the region where the first reflection layer 242 is formed.

Further, the third light source 222 and the second light source 221 that are adjacent to the first light source 220 in the x-axis direction can be disposed in the region where the second reflection layer 243 is formed.

For example, holes (not shown) into which the second light source 221 and the third light source 222 can be inserted can be formed in the second reflection layer 243. As a result, the second and third light sources 221 and 222 mounted on the substrate 210 disposed below the second reflection layer 243 protrude upward through the hole of the second reflection layer 243 to thereby emit the light in the lateral direction.

According to the embodiment of the present invention, a gradation area where the reflectance gradually increases or decreases may be formed at a boundary between the first and second reflection layers 242 and 243 that have different reflectances For example, the reflectance may gradually decrease from one side of the gradation area adjacent to the first reflection layer 242 to the other side adjacent to the second reflection layer 243.

Meanwhile, the pattern 241 formed on the reflection layer 240 explained by referring to FIG. 11 may be formed on both the first reflection layer 242 and the second reflection layer 243 or any one layer of them.

For example, the pattern 241 may be formed on the second reflection layer 243 further separated from the light source 220 on the basis of the direction (indicated by the arrow) in which the light is emitted between the first and second reflection layers 242 and 243. Therefore, it is possible to prevent the luminance of the light source from being reduced in an area far away from the light source 220.

FIG. 32 is a plan view illustrating a second embodiment for a structure of a reflection layer provided in a backlight unit according to the present invention. Description of the same components of the illustrated reflection layer 240 as those explained by referring to FIG. 31 will now be omitted.

Referring to FIG. 32, the reflectance of the second reflection layer 243 can gradually increase or decrease depending on the position of the second reflection layer 243.

According to the embodiment of the present invention, the reflectance of the second reflection layer 243 can gradually decrease in the direction (x-axis direction) in which the light is emitted from the light source 221.

For example, the reflectance of the second reflection layer 243 has the highest reflectance, i.e., the reflectance similar to the reflectance of the first reflection layer 242 on the boundary between the second reflection layer 243 and the first reflection layer 242. The reflectance of the second reflection layer 243 can gradually decrease as the second reflection layer 243 is estranged from the first reflection layer 242.

As described above, the reflectance on the boundary between the first reflection 242 and the second reflection layer 243 can gently be changed by configuring the reflectance of the second reflection layer 243 and as a result, it is possible to reduce a difference of the light luminance generated due to a rapid change of the reflectance on the boundary.

The second reflection layer 243 can be configured by the diffuse reflection sheet as described above. In this case, a diffuse reflection material may be formed in the second reflection layer 243. Therefore, it is possible to gradually decrease or increase the reflectance of the second reflection layer 243 depending on the position by gradually increasing or decreasing the concentration of the diffuse reflection material formed in the second reflection layer 243.

For example, as shown in FIG. 32, the concentration of titanium dioxide ($TiO_2$) which is the diffuse reflection material formed in the second reflection layer 243 can gradually be increased on the direction (x-axis direction) in which the light is emitted from the light source 221. Therefore, the reflectance of the second reflection layer 243 can gradually be decreased.

Figure 33:
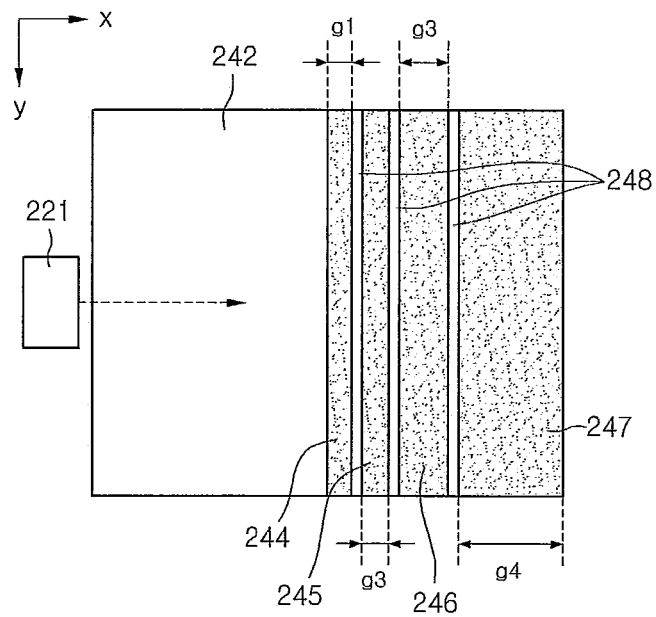
FIG. 33 is a plan view illustrating a third embodiment of a structure of a reflection layer that is provided in a backlight unit according to the present invention.

FIG. 33 is a plan view illustrating a third embodiment for a structure of a reflection layer that is provided in a backlight unit according to the present invention.

Referring to FIG. 33, the second reflection layer 243 can include a firs reflection unit 244 and a second reflection unit 248 having different reflectances. A plurality of first reflection units 244, 245, 246, and 247 and a plurality of second reflection units 248 can be alternatively disposed.

In this case, widths g1, g2, g3, and g4 of the first reflection units 244, 245, 246, and 247 included in the second reflection layer 243 can gradually increase on the basis of the direction (x-axis direction) in which the light is emitted from the light source 221.

Meanwhile, the reflectance of the first reflection units 244, 245, 246, and 247 can be smaller than the reflectance of the second reflection unit 248 and the reflectance of the second reflection unit 248 can be equal to the reflectance of the first reflection layer 242.

For example, the second reflection unit 248 included in the first reflection layer 242 and the second reflection layer 243 can be configured by the above-mentioned specular reflection sheet and the first reflection units 244, 245, 246, and 247 included in the second reflection layer 243 can be configured by the diffuse reflection sheet.

Therefore, the average reflectance of the second reflection layer 243 can be lower than the reflectance of the first reflection layer 242 to thereby provide the uniform luminance of the light in the entire region of the backlight unit 200 as described by referring to FIG. 16.

Meanwhile, as shown in FIG. 33, as the widths g1, g2, g3, and g4 of the first reflection units 244, 245, 246, and 247 are increased as the first reflection units are estranged from the light source 221, the reflectance of the second reflection layer 243 can be gradually decreased like the embodiment shown in FIG. 17.

Therefore, the reflection on the boundary between the first reflection layer 242 and the second reflection layer 243 can be gently changed, such that it is possible to reduce the difference in the luminance of the light generated due to the rapid change of the reflectance on the boundary.

In the above description, the embodiment of the present invention has been described by using a case in which the reflectance of the second reflection layer 243 is changed depending on the position while the first reflection layer 242 has uniform reflectance with reference to FIGS. 32 and 33, but the present invention is not limited thereto.

That is, while the second reflection layer 243 has uniform reflectance, the reflectance of the first reflection layer 242 is changed depending on the position, such that the reflectance on the boundary between the first and second reflection layers 242 and 243 can be gently changed. Contrary to this, the reflectance of each of the first and second reflection layers 242 and 243 may be changed depending on the position.

Figure 34:
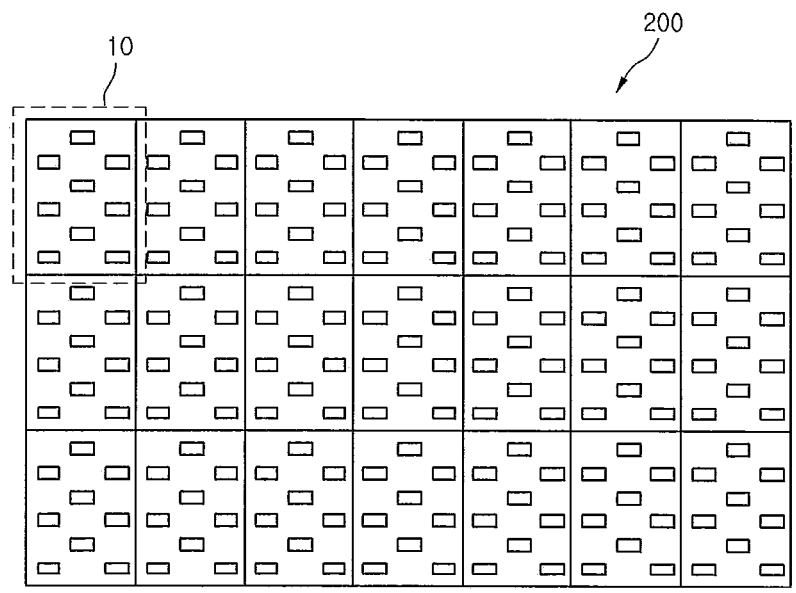
FIG. 34 is a plan view illustrating one embodiment of a configuration of a backlight unit with a plurality of optical assemblies.

FIG. 34 is a cross-sectional view illustrating a configuration of a backlight unit according to yet another embodiment of the present invention.

Referring to FIG. 34, the first layer 210, the plurality of light sources 220 formed on the first layer 210, the second layer 230 covering the plurality of light sources 220, and the reflection layer 240 that are described with reference to FIGS. 3 to 33 can configure one optical assembly 10 and the backlight unit 200 can be configured by disposing the optical assembly 10 in plural.

Meanwhile, in the case of the plurality of optical assemblies 10 provided in the backlight unit 200, N and M (where N or M is a natural number of 1 or more) optical assemblies can be disposed by a matrix type in the x-axis direction and the y-axis direction, respectively.

As shown in FIG. 34, in the backlight unit 200, 21 optical assemblies 10 can be disposed in 7×3 matrix. However, since the configuration shown in FIG. 34 is just one example for describing the backlight unit according to the present invention, the present invention is not limited thereto and can be changed depending on a screen size of the display apparatus, etc.

For example, in the case of a display apparatus having a 47-inch size, the backlight unit 200 can be configured by disposing 240 optical assemblies 10 in 24×10 matrix.

Each of the optical assemblies 10 can be fabricated an independent assembly and the optical assemblies 10 are adjacent to each other to form a module-type backlight unit. The module-type backlight unit as a backlight means can provide the light to the display panel 100.

As described above, the backlight unit 200 can be driven by a full driving scheme or a partial driving scheme such as local dimming, impulsive, etc. The driving scheme of the backlight unit 200 can be variously changed depending on circuit design and is not limited thereto. As a result, in the embodiment, a color contrast ratio is increased and images for a bright part and a dark part can be clearly expressed, such that an image quality is improved.

That is, the backlight unit 200 operates by being divided into a plurality of division driving regions, and the luminance of the dark part is increased and the luminance of the bright part is decreased by linking the luminance of the division driving region with the luminance of a picture signal, thereby improving a contrast ratio and definition.

For example, it is possible to emit the light upward by independently driving only some of the plurality of optical assemblies 10 shown in FIG. 34. For this, the light sources 220 included in the each of the optical assemblies 10 can be independently controlled.

Meanwhile, a region of the display panel 110 corresponding to one optical assembly 10 can be divided into two or more blocks. The display panel 100 and the backlight unit 200 may be separately driven by the unit of a block.

By configuring the backlight unit 200 by assembling the plurality of optical assemblies 10, it is possible to simplify a manufacturing process of the backlight unit 200 and improve productivity by minimizing a loss which can be generated in the manufacturing process. Further, the backlight unit 200 has an advantage applicable to backlight units having various sizes through mass production by standardizing the optical assembly 10.

Meanwhile, when any one of the plurality of optical assemblies 10 provided in the backlight unit 200 has a failure, only the optical assembly having the failure has only to be replaced without replacing the backlight unit 200. Therefore, a replacing work is easy and a part replacement cost is saved.

Figure 35:
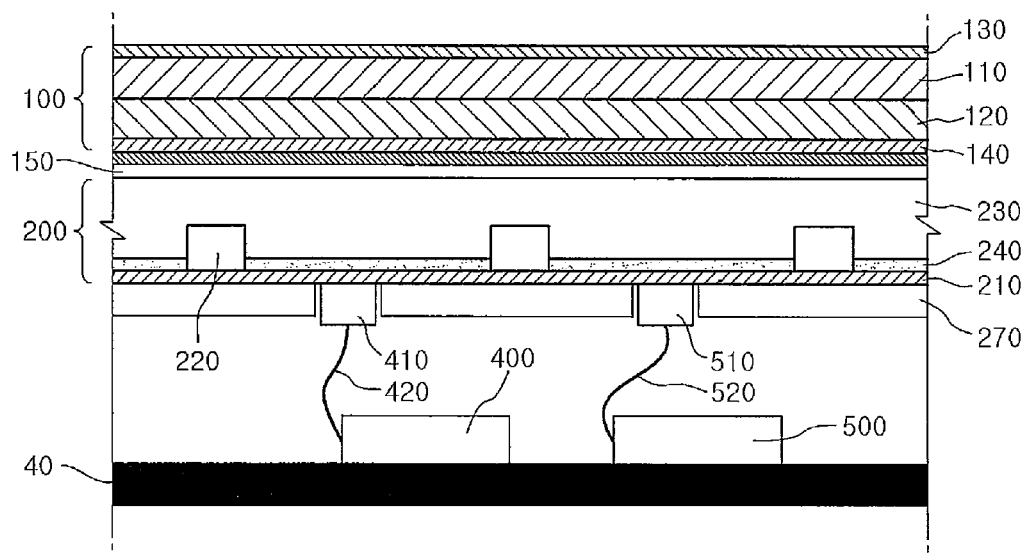
FIG. 35 is a cross-sectional view illustrating a configuration of a display apparatus according to an embodiment of the present invention.

FIG. 35 is a cross-sectional view illustrating a configuration of a display apparatus according to an embodiment of the present invention. Description of the same components of the illustrated display apparatus as those explained by referring to FIGS. 1 to 34 will now be omitted.

Referring to FIG. 35, the display panel 100 including the color filter substrate 110, the TFT substrate 120, the upper polarizer 130, and the lower polarizer 140 and the backlight unit 200 including the substrate 210, the plurality of light sources 220, and the resin layer 230 can closely adhere to each other.

For example, an adhesive layer 150 is formed between the backlight unit 200 and the display panel 100, such that the backlight unit 200 can be adhesively fixed to the bottom of the display panel 100.

More specifically, the top of the backlight unit 200 can adhere to the bottom of the lower polarizer 140 by using the adhesive layer 150.

The backlight unit 200 can further include a diffuse sheet (not shown) and the diffuse sheet (not shown) can closely adhere to the top of the resin layer 230. In this case, the adhesive layer 150 can be formed between the diffuse sheet (not shown) of the backlight unit 200 and the lower polarizer 140 of the display panel 100.

Further, a bottom cover 270 can be disposed in a lower part of the backlight unit 200 and for example, as shown in FIG. 35, the bottom cover 270 can closely adhere to the bottom of the substrate 210. The bottom cover 270 may be configured by a protection film for protecting the backlight unit 200.

Meanwhile, the display apparatus can include a power supply unit 400 for supplying driving voltage to the display module 20, more specifically, the display panel 100 and the backlight unit 200. For example, the plurality of light sources 220 provided in the backlight unit 200 are driven by using the voltage supplied from the power supply unit 400 to emit the light.

As shown in FIG. 35, the power supply unit 400 can be disposed and fixed onto the back cover 40 covering a back surface of the display module 20, such that the power supply unit 400 can be stably supported and fixed.

According to the embodiment of the present invention, a first connector 410 can be formed on the substrate 210. For this, a hole for inserting the first connector 410 can be formed in the bottom cover 270.

The first connector 410 electrically connects the power supply unit 400 with the light source 220 to allow the driving voltage to be supplied from the power supply unit 400 to the light source 220.

For example, the first connector 410 is formed on the bottom of the substrate 210 and is connected to the power supply unit 400 through a first cable 420 to allow the driving voltage supplied from the power supply unit 400 to be transmitted to the light source 220 through the first cable 420.

An electrode pattern (not shown), i.e., a carbon nanotube electrode pattern can be formed on the top of the substrate 210. The electrode formed on the top of the substrate 210 is in contact with the electrode formed in the light source 212 to electrically connect the light source 220 with the first connector 410.

Further, the display apparatus can include a control unit 500 for controlling driving of the display panel 100 and the backlight unit 200. For example, the control unit 500 can be a timing controller.

The timing controller controls a driving timing of the display panel 100. More specifically, the timing controller generates a signal for controlling the driving timings of a data driver unit (not shown), a gamma voltage generator (not shown), and a gate driver (not shown) that are provided in the display panel 100 to supply the generated signal to the display panel 100.

Meanwhile, the timing controller synchronizes with driving of the display panel 100 and can supply a signal for controlling driving timing of the light sources 220 to the backlight unit 200, such that the backlight unit 200, more specifically, the light sources 220 operate.

As shown in FIG. 35, the control unit 500 can be disposed and fixed onto the back cover 40 covering a back surface of the display module 20, such that the control unit 500 can be stably supported and fixed.

According to the embodiment of the present invention, a second connector 510 can be formed on the substrate 210. For this, a hole for inserting the second connector 510 can be formed in the bottom cover 270.

The second connector 510 electrically connects the control unit 500 with the substrate 210 to allow a control signal outputted from the control unit 500 to be supplied to the substrate 210.

For example, the second connector 510 is formed on the bottom of the substrate 210 and is connected to the control unit 500 through a second cable 520 to allow the control signal supplied from the control unit 500 through the second cable 520 to be transmitted to the substrate 210.

Meanwhile, a light source driving unit (not shown) can be formed in the substrate 210. The light source driving unit (not shown) can drive the light sources 220 by using the control signal supplied from the control unit 200 through the second connector 510.

The configuration of the display apparatus shown in FIG. 35 is just one embodiment of the present invention. Therefore, the positions or numbers of the power supply unit 400, the control unit 500, the first and second connector 410 and 420, and the first and second cables 420 and 520 can be changed as necessary.

For example, the first and second connector 410 and 420 can be provided in each of the plurality of optical assemblies 10 configuring the backlight unit 200 as shown in FIG. 19. The power supply unit 400 or the control unit 500 can be disposed on the bottom of the bottom cover 270.

Figure 36:
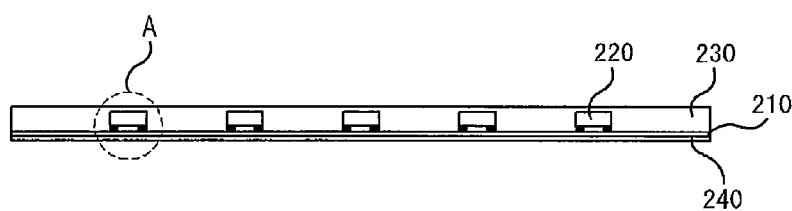
FIG. 36 is a schematic sectional view of a backlight unit according to a eighth exemplary embodiment of the present invention.

FIG. 36 is a schematic sectional view of a backlight unit according to a eighth exemplary embodiment of the present invention. The backlight unit according to the eighth exemplary embodiment of the present invention comprises a first layer 210, a carbon nano-tube (CNT) electrode pattern formed on an upper portion of the first layer 210, light sources (such as light emitting diodes or light emitting diode chips) 220 bonded to the CNT electrode pattern, a second layer formed on the first layer 210 and covering the light sources 220; and a reflection layer 240 attached to a lower surface of the first layer 210.

Here, the backlight unit according to the eighth exemplary embodiment of the present invention comprises the constituents such as the first layer 210, the CNT electrode pattern, the light sources 220, the second layer, and the reflection layer 240, and in a different exemplary embodiment (to be described), some of the constituents of the backlight unit according to the eighth exemplary embodiment of the present invention may be substituted by different constituents.

The reflection layer 240 may have an adhesive component on a surface thereof which is in contact with the first layer 210, or may not have such a component.

As the reflection layer 240, a reflective sheet formed by dispersing white pigment such as titanium dioxide or the like on a sheet made of a synthetic resin material, or a reflective sheet formed by stacking a metallic deposition film on a surface thereof, or a reflective sheet formed by dispersing bubbles on a sheet made of a synthetic resin material in order to diffuse light, or the like, may be used, and reflective sheets having any other structures may be also applicable as the reflection layer 240.

Preferably, the reflection layer 240 has a thickness ranging from 50 μm to 300 μm, and most preferably, it has a thickness ranging from 100 μm to 200 μm.

Also, the reflection layer 240 may have a reflectivity of at least 85 percent or greater, and preferably, it has a value of 90 percent or greater.

In this manner, in the backlight unit according to the present exemplary embodiment, the second layer 230 is formed on the lower first layer 210 such that it covers the light sources 220, so in case of using a thin substrate, the backlight unit can be substantially as thick as light sources 220, advantageously implementing a lighter and thinner backlight unit.

Also, in the backlight unit according to the present exemplary embodiment, because the reflection layer 240 is formed on the lower portion of the first layer, light emitted from the light emitting elements can be reflected to the upper side of the light emitting elements, increasing the quantity of light emitted from the backlight unit.

Furthermore, the backlight unit according to the present exemplary embodiment may use the light emitting diode chip instead of the package inside which the light emitting diode chip is mounted. Hence, a path of heat generated in the package may be omitted, and the heat may be emitted smoothly.

Figure 37:
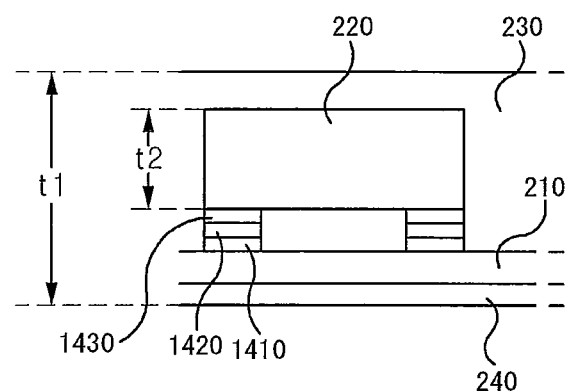
FIG. 37 is an enlarged view of a portion 'A' in FIG. 36.

FIG. 37 is an enlarged view of a portion 'A' in FIG. 36, in which the CNT electrode pattern 1410 is formed on the first layer 210, and an electrode pad 1430 is formed on the light source 220.

Thus, the electrode pad 1430 formed on the Light source 220 is bonded to the CNT electrode pattern 1410 formed on the upper portion of the first layer 210 by using conductive paste 1420.

Here, preferably, the conductive paste 1420 is Ag paste.

Namely, the light source 220 is directly bonded to the CNT electrode pattern 1410 formed on the upper portion of the first layer 210, and the electrode pad 1430 of the light source 220 is electrically connected with the CNT electrode pattern 1410.

Also, because the second layer 230 is formed such that it is close to an upper portion of the light source 220, the thickness of the light source 220 and that of the second layer 230 can be adjusted to be quite thin.

As for the thickness of the backlight unit according to the eighth exemplary embodiment of the present invention, preferably, the thickness obtained by subtracting a thickness t2 of the light source 220 from the overall thickness t1 (i.e., the thickness of the reflection layer+ the thickness of the first+ the thickness of the second layer) of the backlight unit is regulated to be smaller than the thickness t2 of the light source 220, and with this terms met, the thickness t1 of the backlight unit is dependent upon the thickness t2 of the light source 220, so an ultra-thin backlight unit can be implemented.

Namely, the current technique allows for implementation of the light sources 220 with a thickness ranging from 50 μm to 200 μm. Thus, when a backlight unit is fabricated under the above terms with such light sources 220 having the thickness of 50 μm, the thickness obtained by subtracting the thickness t2 of the light source 220 from the overall thickness t1 of the backlight unit is smaller than 50 μm.

Accordingly, the backlight unit can have a thickness smaller than 100 μm, and thus, the ultra-thin backlight unit can be implemented.

Figure 38:
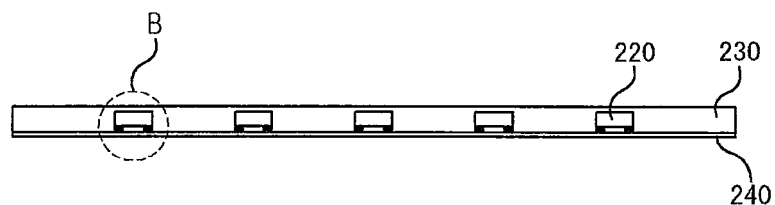
FIG. 38 is a schematic sectional view of a backlight unit according to a ninth exemplary embodiment of the present invention.

FIG. 38 is a schematic sectional view of a backlight unit according to a ninth exemplary embodiment of the present invention. The backlight unit according to the ninth exemplary embodiment of the present invention comprises a reflection layer 240, a carbon nano-tube (CNT) electrode pattern formed on an upper portion of the reflection layer 240, light source 220 bonded to the CNT electrode pattern; and a second layer formed on the reflection layer 240 and covering the light source 220.

Thus, compared with the backlight unit according to the eighth exemplary embodiment of the present invention, the backlight unit according to the ninth exemplary embodiment is configured such that the CNT electrode pattern is formed on the reflection layer, rather than on a first layer, so the thickness of the backlight unit can be reduced as large as the thickness of the first layer, implementing an even thinner backlight unit.

Figure 43:
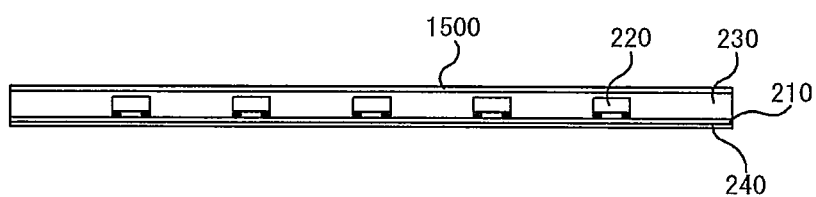
FIGS. 43 and 44 are schematic sectional views showing the substrate formed on the packed beds of the backlight units according to the eighth and ninth exemplary embodiments of the present invention.
Figure 44:
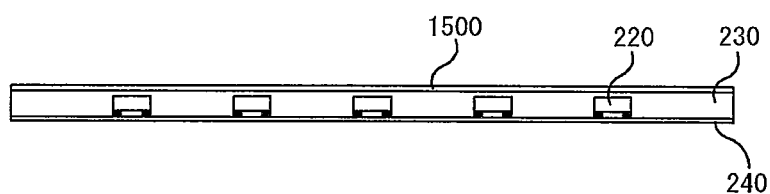

Meanwhile, preferably, as shown in FIGS. 43 and 44, the backlight units according to the eighth and ninth exemplary embodiments of the present invention further comprise a substrate 1500 attached on the upper surface of the second layer in order to protect the second layer.

Figure 39:
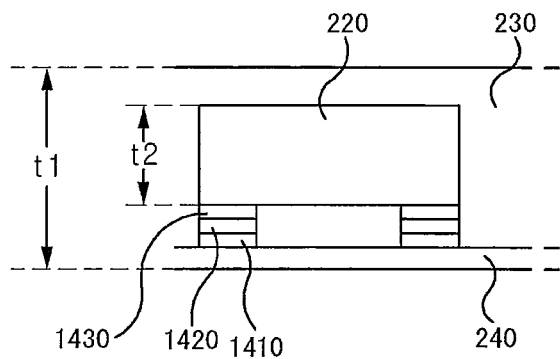
FIG. 39 is an enlarged view of a portion 'B' in FIG. 38.

FIG. 39 is an enlarged view of a portion 'B' in FIG. 38. The thickness obtained by subtracting the thickness t2 of the Light source 220 from an oval thickness t3 of the backlight unit according to the ninth exemplary embodiment of the present invention is smaller than the thickness obtained by subtracting the thickness t2 of the light source 220 from the overall thickness t1 of the backlight unit according to the eighth exemplary embodiment of the present invention as mentioned above with reference to FIG. 37.

The reason is because the backlight unit according to the ninth exemplary embodiment does not have such a substrate as that of the backlight unit according to the eighth exemplary embodiment of the present invention.

Figure 40:
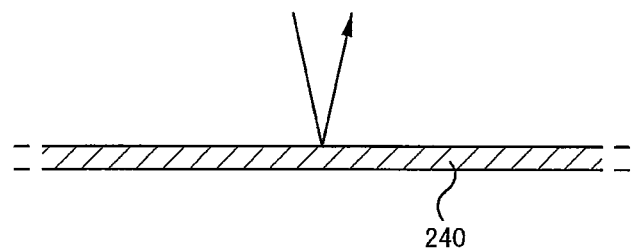
FIGS. 40 and 41 are partial sectional views showing examples of reflective sheets applied to the backlight unit according to an exemplary embodiment of the present invention.
Figure 41:
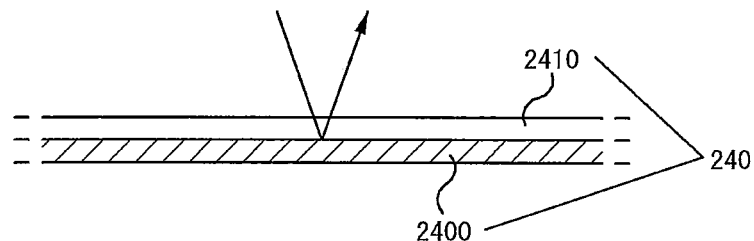

FIGS. 40 and 41 are partial sectional views illustrating examples of reflection layer applied to the backlight unit according to an exemplary embodiment of the present invention, in which light proceeding to the reflection layer is reflected by the reflection sheet so as to be output upward.

The reflective layer may be configured as a single reflective layer 240 that can reflect light overall as shown in FIG. 40, or may be configured as stacked films 2400 and 2410 formed by stacking at least two or more films including a reflective sheet.

Of course, the reflection layer may have diverse detailed configurations.

Figure 42:
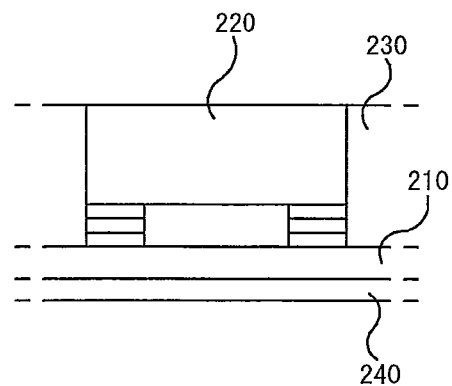
FIG. 42 is a partial sectional view for explaining a method of reducing the thickness of the backlight unit according to an exemplary embodiment of the present invention.

FIG. 42 is a partial sectional view for explaining a method of reducing the thickness of the backlight unit according to an exemplary embodiment of the present invention. In FIG. 42, the second layer is formed to cover the light source 220, but the present invention is not limited thereto and the second layer may be formed such that it exposes an upper surface of the light source 220 in order to further reduce the thickness of the backlight unit.

Accordingly, because the region of the second layer present on the upper surface of the light source 220 is removed, the overall thickness of the backlight unit can be reduced.

Figure 45:
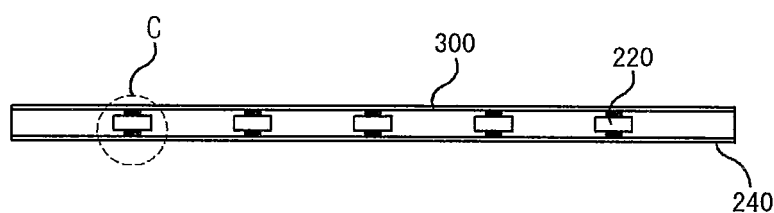
FIG. 45 is a schematic sectional view of a backlight unit according to a tenth exemplary embodiment of the present invention.

FIG. 45 is a schematic sectional view of a backlight unit according to a tenth exemplary embodiment of the present invention. As shown in FIG. 45, the backlight unit according to the tenth exemplary embodiment of the present invention comprises a reflection layer 240, a first carbon nano-tube (CNT) electrode pattern formed on an upper portion of the reflection layer 240, vertical light sources 220 comprising lower and upper electrode pads bonded to the first CNT electrode pattern; a second layer formed on the reflection layer 240, covering the vertical light sources 220, and exposing the upper electrode pad; and a substrate 300 attached to an upper surface of the second layer and comprising a second CNT electrode pattern bonded with the upper electrode pad.

The backlight unit according to the tenth exemplary embodiment of the present invention employs the vertical light sources 220.

Because the CNT electrode patterns are bonded to the upper and lower electrode pads of the vertical light sources 220, heat generated from the vertical light sources 220 can be released through the CNT electrode patterns. Thus, the heat release efficiency can be increased to strengthen thermal stability and thus improve reliability.

In addition, in the backlight unit according to the tenth exemplary embodiment of the present invention, the reflection layer and the substrate are bonded with the second layer, thus improving firmness.

Here, preferably, the second layer is made of a thermosetting (or curing) material, and as the second layer is hardened, the reflection layer and the substrate are bonded with the second layer.

Figure 46:
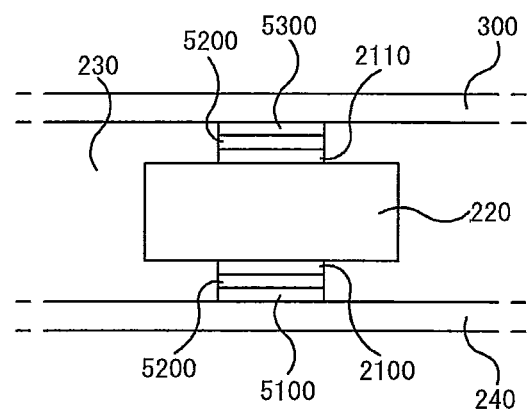
FIG. 46 is a partial enlarged sectional view showing a portion 'C' in FIG. 45 to explain an example of the backlight unit according to the tenth exemplary embodiment of the present invention.

FIG. 46 is a partial enlarged sectional view showing a portion 'C' in FIG. 45 to explain an example of the backlight unit according to the tenth exemplary embodiment of the present invention. As shown in FIG. 46, an upper electrode pad 2110 is formed on an upper portion of the vertical light sources 220, and a lower electrode pad 2100 is formed on a lower portion of the vertical light sources 220.

The backlight unit according to the tenth exemplary embodiment of the present invention may be implemented such that the upper electrode pad 2110 of the vertical light sources 220 is bonded to the second CNT electrode pattern 5300 formed at the upper portion of the second layer by using conductive paste 5200, and the lower electrode pad 2100 of the vertical light sources 220 is bonded to the first CNT electrode pattern 5100 formed at the upper portion of the reflection layer 240.

Figure 47:
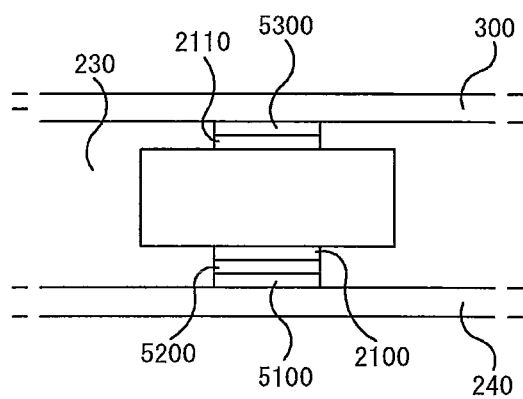
FIG. 47 is a partial enlarged sectional view showing a portion 'C' in FIG. 45 to explain another example of the backlight unit according to the tenth exemplary embodiment of the present invention.

Also, as shown in FIG. 47, the backlight unit according to the tenth exemplary embodiment of the present invention may be implemented such that the upper electrode pad 2110 of the vertical light sources 220 is in contact with the second CNT electrode pattern 5300 formed on the substrate 300 attached to the upper portion of the second layer, and the lower electrode pad 2100 of the vertical light sources 220 is bonded to the first CNT electrode pattern 5100 formed on the upper portion of the reflection layer 240.

Thus, in the structure illustrated in FIG. 47, although the upper electrode pad 2110 of the vertical light sources is in contact with the second CNT electrode pattern 5300, because the substrate 300 on which the second CNT electrode pattern 5300 is formed is attached to the second layer, the contact state of the upper electrode pad 2110 is not released.

Figure 48:
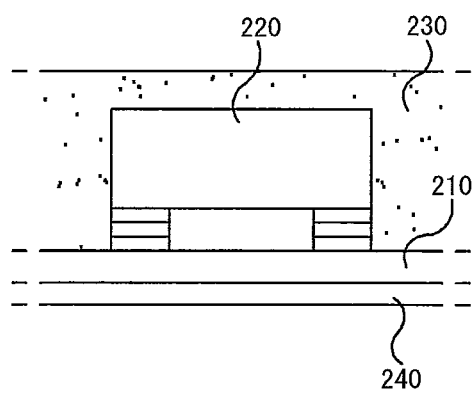
FIGS. 48 and 49 are schematic partial sectional views for explaining phosphor included in a backlight unit according to an exemplary embodiment of the present invention.
Figure 49:
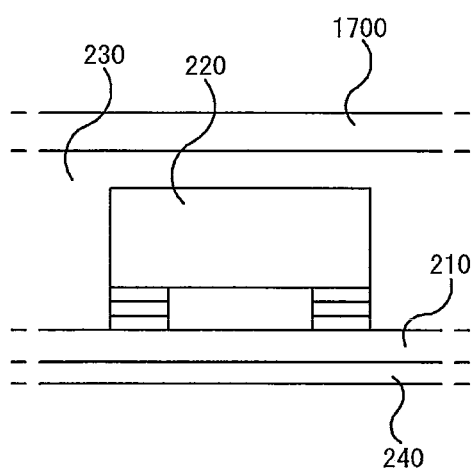

FIGS. 48 and 49 are schematic partial sectional views for explaining phosphor included in a backlight unit according to an exemplary embodiment of the present invention. If a plurality of light sources installed in the backlight unit emit at least one of red light, green light, and blue light, then the red light, green light, and blue light emitted from the plurality of light sources can be outputted from the backlight unit as it is.

In this case, the red light, green light, and blue light outputted from the backlight unit need to be properly wavelength-converted so as to be made incident as white light to a liquid crystal panel.

Thus, in an exemplary embodiment of the present invention, it may be implemented such that light emitted from the backlight unit is white light, for which a second layer 230 in which phosphor is dispersed as shown in FIG. 48 is used.

Also, as shown in FIG. 49, a phosphor layer 1700 may be formed on the second layer.

Accordingly, the phosphor dispersed in the second layer 230 and the phosphor layer 1700 formed on the second layer wavelength-convert light emitted from the plurality of light sources, and light which has passed through the phosphor disposed in the second layer or through the phosphor layer formed on the second layer becomes white light.

Meanwhile, if the plurality of light sources installed in the backlight unit are white light sources, the second layer in which the phosphor is dispersed or the phosphor layer are not required.

Figure 50:
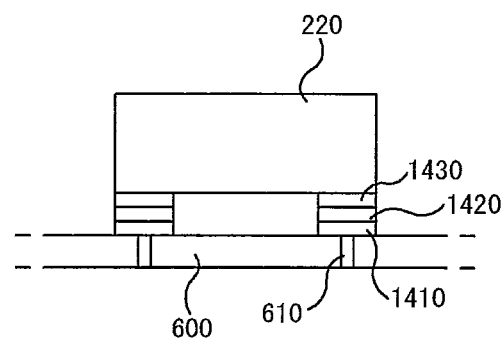
FIG. 50 is a schematic partial sectional view for explaining a method for improving a heat release efficiency of the backlight according to an exemplary embodiment of the present invention.

FIG. 50 is a schematic partial sectional view for explaining a method for improving a heat release efficiency of the backlight according to an exemplary embodiment of the present invention. As afore-mentioned, the CNT electrode pattern 1410 is bonded to be electrically connected with the pad 1430 of the light source 220, so heat generated from the light source 220 can be released through the CNT electrode pattern 1410.

Besides the method, in order to more effectively release heat generated from the light source 220, a through hole 610 may be formed in the substrate or a region of a reflective sheet 600 where the CNT electrode pattern 1410 is formed. Accordingly, heat transferred to the CNT electrode pattern 1410 can be easily released through the through hole 610.

Here, the through hole 610 is blocked by the CNT electrode pattern 1410, not allowing the second layer from being infiltrated thereinto.

Figure 51:
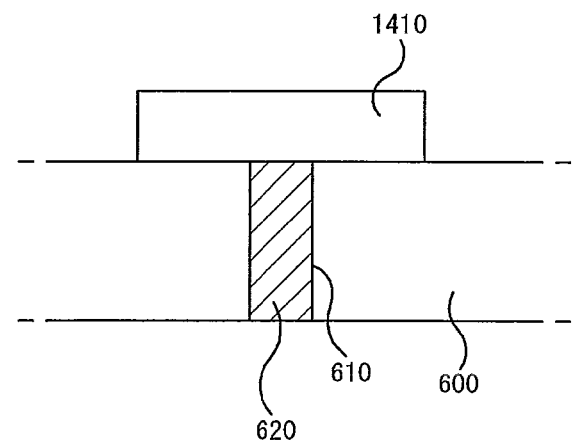
FIGS. 51 and 52 are schematic partial sectional views for explaining another method for improving a heat release efficiency of the backlight according to an exemplary embodiment of the present invention.
Figure 52:
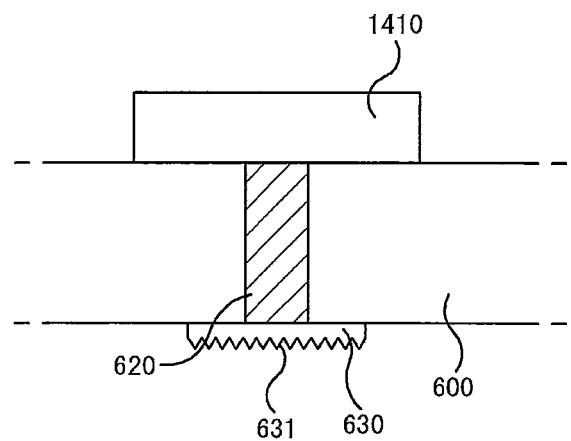
Figure 53:
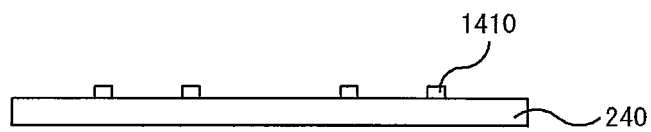
FIGS. 53 to 56 are schematic sectional views for explaining a method for fabricating a backlight unit according to an exemplary embodiment of the present invention.

FIGS. 51 and 52 are schematic partial sectional views for explaining another method for improving a heat release efficiency of the backlight according to an exemplary embodiment of the present invention. As shown in FIGS. 51 and 52, the through hole 610 of FIG. 50 formed in the substrate or reflective sheet 600 may be filled with a thermally conductive filler 620 to further improve releasing of heat generated from the light sources (See FIG. 51).

Also, a heat release pad 630 connected with the filler 620 having good thermal conductivity of FIG. 51 may be formed on the first layer or the reflective sheet 600. In this case, the heat release pad 630 has protrusions and depressions (or irregular portions or concavo-convex portions) formed on its surface to increase the heat releasing section, thus improving the heat release efficiency.

FIGS. 53 to 56 are schematic sectional views for explaining a method for fabricating a backlight unit according to an exemplary embodiment of the present invention. First, the CNT electrode pattern 1410 is formed on the reflection layer 240 (See FIG. 53).

Figure 54:
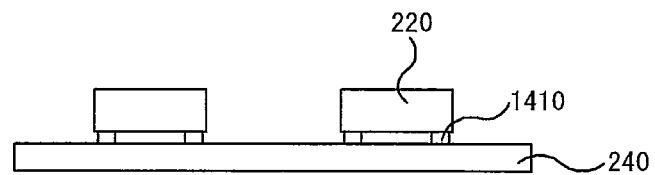

Next, the plurality of light sources 220 are bonded to the CNT electrode pattern 1410 by using conductive paste such that they are electrically connected with the CNT electrode pattern 1410 (See FIG. 54).

Figure 55:
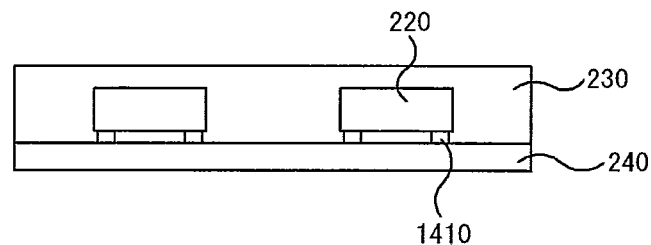

And then, the second layer is formed on the reflection layer 240 such that is covers the plurality of light sources 220 (See FIG. 55).

Figure 56:
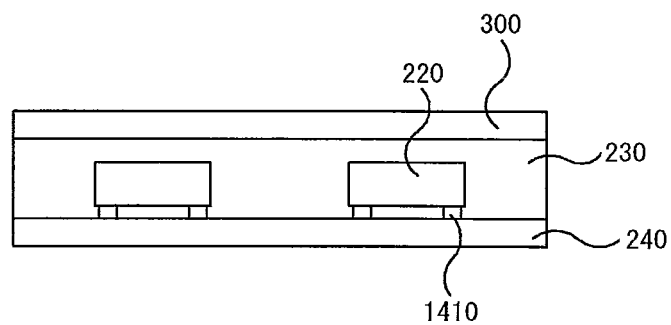

Thereafter, the substrate 300 is attached to the upper portion of the second layer (See FIG. 56).

If the second layer is made of a thermosetting material, a thermosetting process is preferably performed following the process of FIG. 56.

The first layer applied to the backlight units according to the exemplary embodiments of the present invention are transparent substrates, and they can be applicable so long as a significant light loss is not made with an organic compound and an inorganic compound.

Here, preferably, the first layer applied to the backlight units according to the exemplary embodiments of the present invention are made of one of PET (polyethylene terephthalate), glass, polycarbonate, and silicon.

Most preferably, the first layers are PET substrates.

The reason is because a PET resin has excellent heat resistance, rigidity, and electrical properties, and exhibits the ultimate strength which is slightly reduced although the PET resin is exposed to a high temperature for a long period of time. In addition, because the PET resin belongs to crystalline plastic, it has good resistance to oil such as diesel.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof. For example, components specifically described in the embodiment of the present invention can be modified. In addition, it should be appreciated that differences related to the modification and application fall within the scope of the present invention, which is prescribed in the appended claims.

What is claimed is:

1. A light emitting device comprising:
a substrate;
a reflective sheet disposed on the substrate;
a plurality of light emitting components disposed on the substrate;
a resin layer formed on the plurality of light emitting components and the reflective sheet;
a reflective pattern layer disposed on the resin layer, the reflective pattern layer overlapping with the light emitting components in a vertical direction; and
a plurality of diffusers disposed on the reflective sheet,
wherein the reflective pattern layer includes a first reflective pattern layer corresponding to first light emitting components and a second reflective pattern layer corresponding to second light emitting components adjacent to the first light emitting components,
wherein the first light emitting components and the second light emitting components emit a light in a lateral direction, and
wherein a distance between the first light emitting components and the second reflective pattern layer is different from a distance between the second light emitting components and the first reflective pattern layer.

2. The light emitting device of claim 1, wherein the plurality of light emitting components are a plurality of light emitting chips.

3. The light emitting device of claim 1, wherein the plurality of light emitting components are a plurality of light emitting packages, each package including a light emitting chip.

4. The light emitting device of claim 1, wherein the plurality of light emitting components are disposed in at least one array.

5. The light emitting device of claim 1, wherein the resin layer completely covers the light emitting components.

6. The light emitting device of claim 1, wherein the resin layer contacts the light emitting components and the reflective sheet.

7. The light emitting device of claim 1, wherein a thickness of at least one of the plurality of light emitting components is equal to a thickness of the resin layer.

8. The light emitting device of claim 1, further comprising third light emitting components adjacent to the second light emitting components,
wherein each of the first, second and third light emitting components includes a light emitting surface,
wherein the light emitting surface of the first light emitting components faces the second light emitting components, and the light emitting surface of the second light emitting components faces the third light emitting components, and
wherein the distance between the first light emitting components and the second reflective pattern layer is greater than the distance between the second light emitting components and the first reflective pattern layer.

* * * * *